Figure 1:
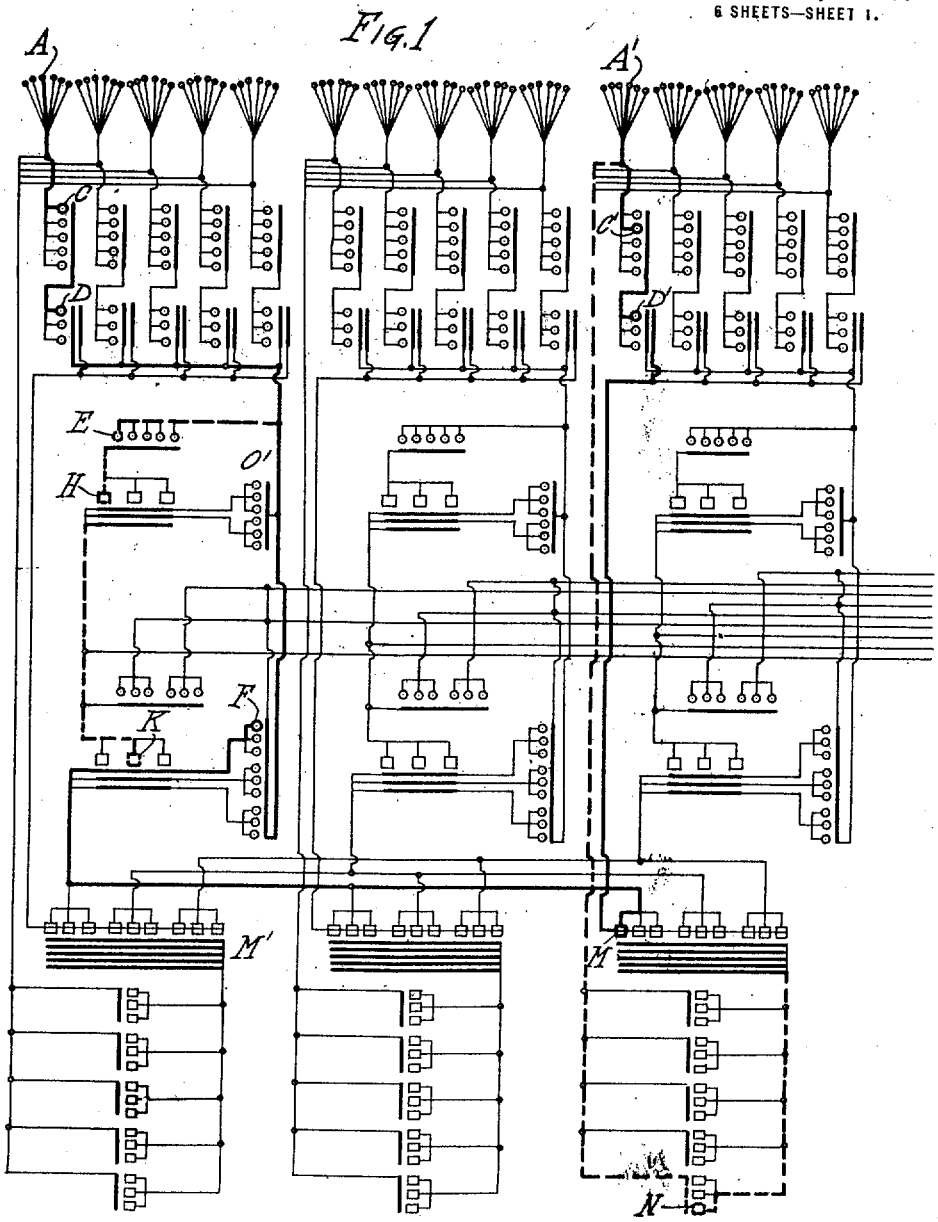

A. M. MALMBERG.

AUTOMATIC TELEPHONE TRUNKING SYSTEM.

APPLICATION FILED DEC. 1, 1921.

Reissued Oct. 17, 1922.

15,471.

6 SHEETS—SHEET 1.

Inventor

Anders M. Malmberg

Chas. Tu. Candy Atty.

A. M. MALMBERG.

AUTOMATIC TELEPHONE TRUNKING SYSTEM.

APPLICATION FILED DEC. 1, 1921.

Reissued Oct. 17, 1922.

15,471.

6 SHEETS—SHEET 2.

Inventor

Anders H. Malmberg

Chas. W. Candy Atty.

A. M. MALMBERG.

AUTOMATIC TELEPHONE TRUNKING SYSTEM.

APPLICATION FILED DEC. 1, 1921.

Reissued Oct. 17, 1922. 15,471.

6 SHEETS—SHEET 3.

Inventor
Anders M. Malmberg
Chas. Ten Cate Atty.

A. M. MALMBERG.

AUTOMATIC TELEPHONE TRUNKING SYSTEM.

APPLICATION FILED DEC. 1, 1921.

Reissued Oct. 17, 1922. 15,471.

6 SHEETS—SHEET 4.

—Inventor—

Anders M. Malmberg

Chas. Ch. Cady Atty.

A. M. MALMBERG.

AUTOMATIC TELEPHONE TRUNKING SYSTEM.

APPLICATION FILED DEC. 1, 1921.

Reissued Oct. 17, 1922.

15,471.

6 SHEETS—SHEET 5.

—Inventor—

Anders M. Malmberg

Chas. Th. Candy. Atty:

A. M. MALMBERG.

AUTOMATIC TELEPHONE TRUNKING SYSTEM.

APPLICATION FILED DEC. 1, 1921.

Reissued Oct. 17, 1922. 15,471.

6 SHEETS—SHEET 6.

—Inventor—

Anders M. Malmberg

Chas. Tu. Comly Atty.

Draftsman

/8

Reissued Oct. 17, 1922. Re. 15,471

UNITED STATES PATENT OFFICE.

ANDERS M. MALMBERG, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE TRUNKING SYSTEM.

Original application filed February 5, 1916, Serial No. 76,308. Renewed May 31, 1919, Serial No. 301,127. Original No. 1,326,680, dated December 30, 1919. Application for reissue filed December 1, 1921. Serial No. 519,080½.

*To all whom it may concern:*

Be it known that I, ANDERS M. MALMBERG, a citizen of the United States, and a resident of Chicago, county of Cook, and State of Illinois, have invented certain new and useful Improvements in Automatic Telephone Trunking Systems, of which the following is a specification.

My invention relates to automatic telephone trunking systems and more particularly to those trunking systems in which the talking circuit is completed over a different path from that used in the selection of the called line. In these systems non-numerical and numerical switches may be used to extend a connection to a called line; whereupon certain non-numerical switches accessible to the called line are operated to connect with the calling line at some intermediate point in the connection, thereby completing a new connection between the two lines by a more direct route, and making it possible, accordingly, to release certain switches used in the original connection to make them accessible to other calls.

The object of my invention is to provide, in a system of the above character, an improved trunking arrangement whereby such a system may be adapted to serve a large number of subscribers comprising a plurality of exchanges.

A further object of my invention is the provision of improved circuits and trunking devices whereby the efficiency of such a system is increased and the amount of apparatus required is considerably reduced.

To accomplish these and other useful objects my invention comprises the means hereinafter set forth and claimed.

Figure 2:
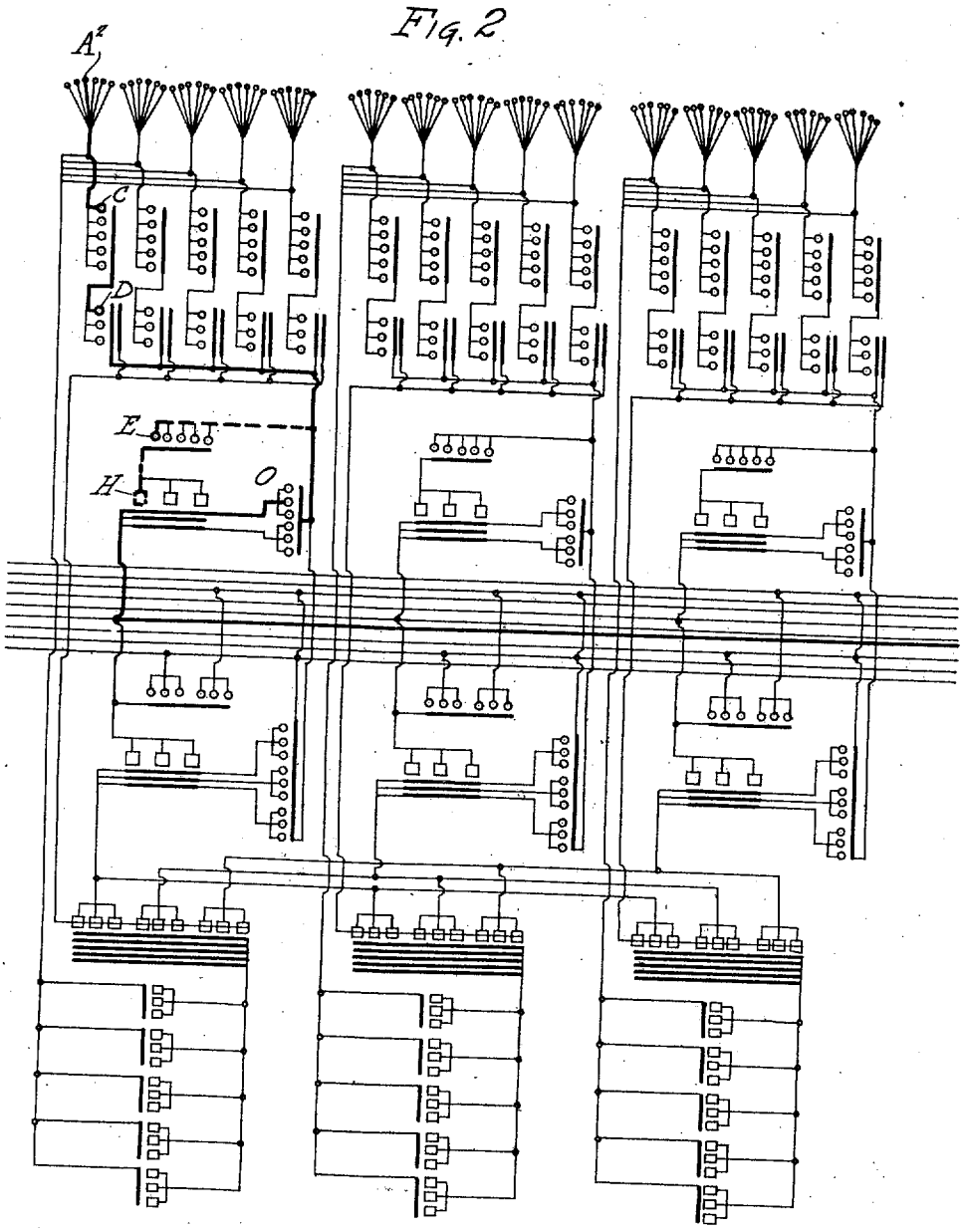
Figure 3:
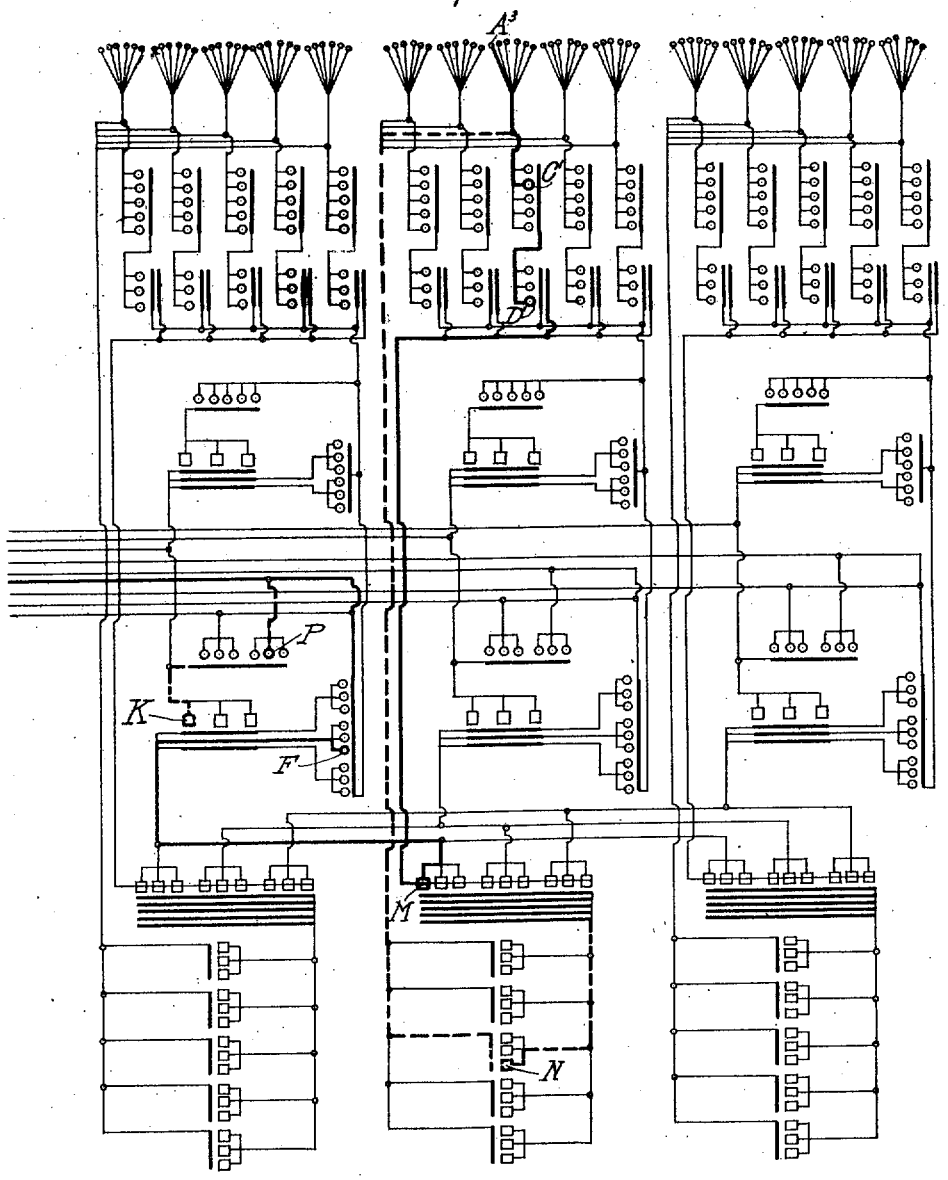

In the drawings Figures 1, 2 and 3 represent diagrammatically the layout of a telephone system embodying the principles of my invention.

Figure 4:
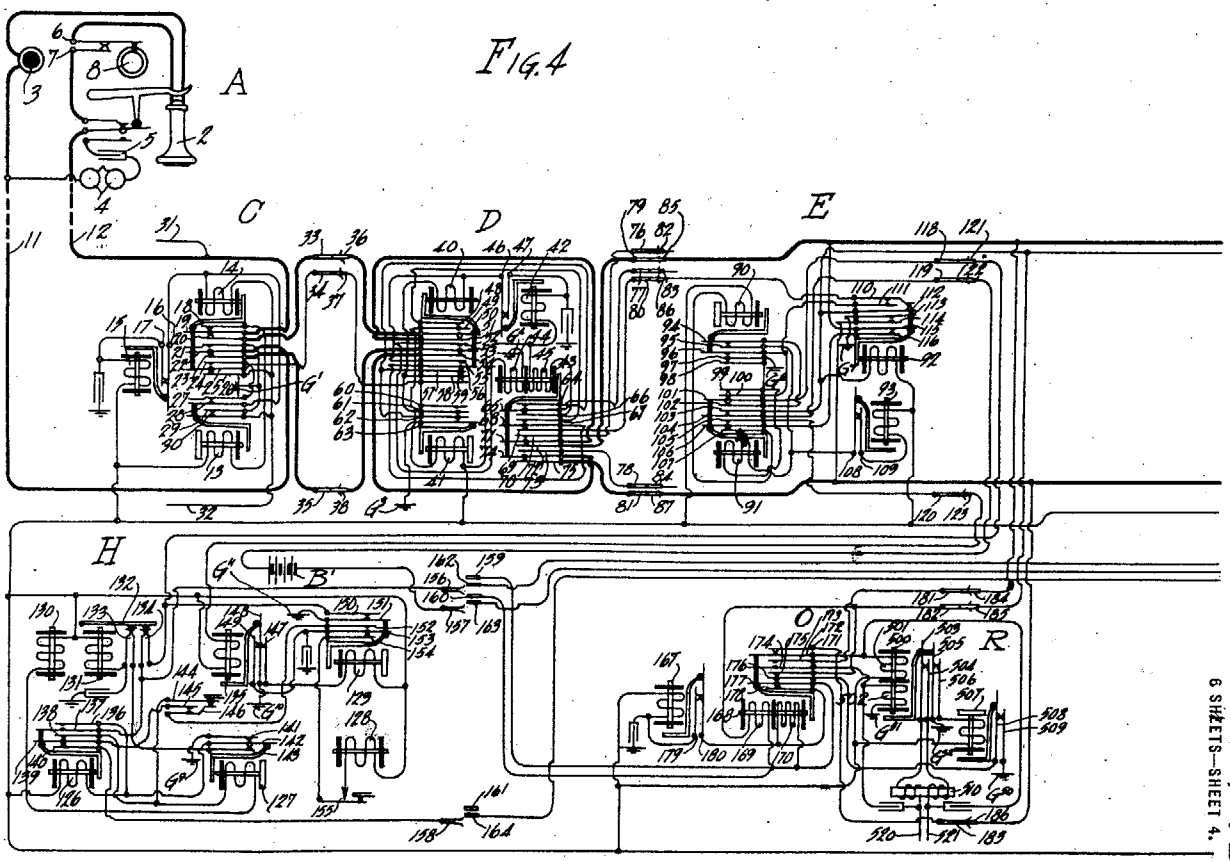
Figure 5:
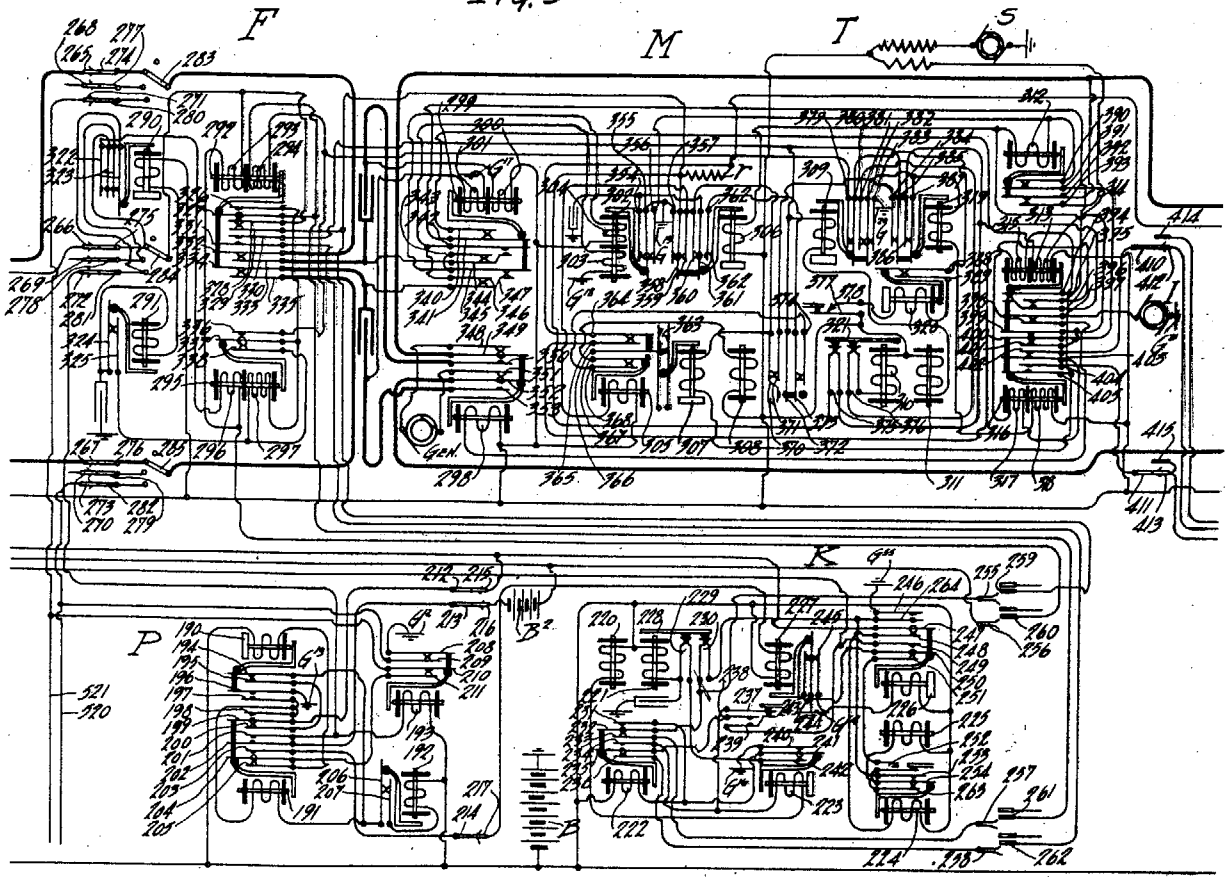
Figure 6:
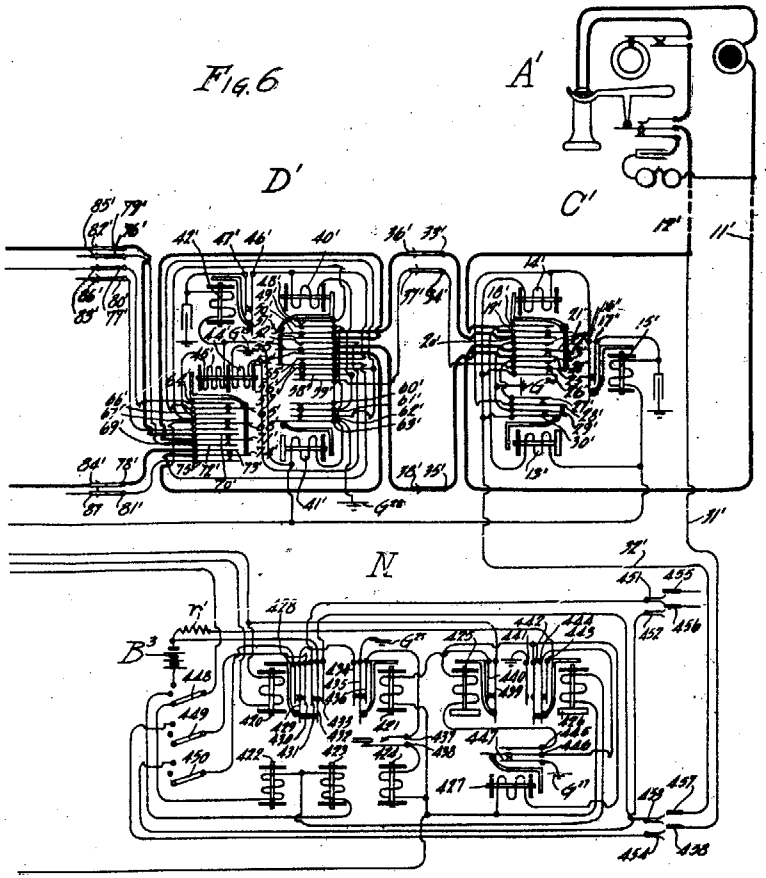

Figs. 4, 5 and 6 taken together show a complete circuit connection between a substation A and a substation A′ in the above system.

Referring to Figs. 1, 2, and 3, these drawings being arranged in order with the lines at the sides thereof in alinement, I will describe in a general way the method of carrying out my invention. The system as outlined has a total capacity of 100,000 lines terminating in ten offices or exchanges of 10,000 lines each. In Fig. 1 I have shown one of these 10,000 line exchanges; in Fig. 2 I have shown a second 10,000 line exchange; and in Fig. 3 I have shown a third 10,000 line exchange. While these exchanges are substantially alike, I prefer to show several of them in order that the trunking between exchanges may be more clearly illustrated. Following this plan further I have shown in each 10,000 line exchange three different thousand line groups. Each thousand line group is made up of five two hundred line groups as shown, one such group being represented at A and another at A′. This is as far as the subdivision goes, the number of lines in the smallest group being determined by the capacity of a connector group which in my system is two hundred lines.

I will first describe the method of trunking between a calling substation A and a called substation A′ the two being in the same exchange but in different thousand line groups.

Each substation is connected at the exchange to an individual rotary line switch C which, upon the initiation of a call, operates to select an idle secondary line switch D. The secondary line switch D has a double bank, one level containing contacts which are terminals of trunk lines extending to third selectors M′ and the other level containing contacts which are terminals of trunk lines extending to tertiary line switches E, these trunk lines being also multipled in the banks of finder switches O′ and F.

When operated by a calling line, the secondary line switch D selects an idle tertiary line switch E which in turn operates to select an idle first selector H. The subscriber at substation A may now manipulate his calling device for the first digit of the desired number, which, since substation A′ is located in the first 10,000 line exchange, will be 1, thereby raising the wipers of the first selector until they stand opposite the first level, whereupon they are automatically rotated to select an idle second selector K. A′ being located in the third thousand line group the next digit called will be three, which raises the wipers of the second selector until they stand opposite the third level, whereupon they are automatically rotated to select an idle third selector M. The normal wires from the two hundred line group of which substation A′ is one, are shown multipled in the banks of the first connector group, this group serving the first and second hundreds. The third digit of the desired number may therefore, be either one or two, and upon operating the calling device for this digit, the wipers of the third selector will be raised opposite the first or second level as the case may be, whereupon they are rotated automatically to select an idle connector N. The connector N, it should be explained, is provided with a separate bank for each hundred which it serves and a double set of wipers, the set rendered active depending on the level upon which the third selector wipers are resting.

At this stage of the operation the finder switch F is set in motion and it rotates until it finds the trunk extending from the secondary line switch D to the tertiary line switch E, which trunk, as has already been explained, is multipled in the banks of the finder switches F and O′. A connection may now be traced directly from the secondary line switch D, through the finder switch F to the third selector M, and the first and second selectors H and K may be dispensed with, these switches, being, in fact, disconnected at this time and made accessible to other calls.

The subscriber at substation A may now operate his calling device to select the last two digits of the desired line, whereupon the wipers of the connector N are raised and rotated until they rest upon the normal contacts of the line extending to the desired substation A′. The line switch C′, individual to the line of substation A′, is now operated and selects an idle secondary line switch D′. The secondary line switch D′ then operates to connect with the third selector M. The called line being now directly connected to the third selector M, the connector N is no longer necessary and may be released together with the wipers of the third selector. A complete talking connection has now been established between substation A and substation A′ which may be traced as follows: substation A, line switch C, secondary line switch D, finder switch F, relays of third selector M, secondary line switch D′, and line switch C′ to substation A′.

I will now describe briefly the trunking between a calling substation $A^2$ and a called substation $A^3$, the two being located in separate 10,000 line exchanges. Referring to Figs. 2 and 3, upon the initiation of a call, the line switch C individual to the calling substation $A^2$ operates to select an idle secondary line switch D; which in turn operates to select an idle tertiary line switch E; which operates in its turn to select an idle first selector H, all in a manner which has been described.

The called substation $A^3$ is located in the third 10,000 line exchange and therefore the first digit of the number to be called is 3. By manipulating the dial at the calling substation in accordance with this digit the wipers of the first selector H will be raised until they stand opposite the third level, whereupon they will be rotated automatically to select an idle trunk extending to the distant exchange shown in Fig. 3 and terminating therein in a tertiary line switch P, which operates to select an idle second selector K. The finder switch O (Fig. 2) is now set in motion and rotates until its wipers reach the terminal of the trunk line extending from the secondary line switch D to the tertiary line switch E, whereupon the first selector H is released and a connection is established from the calling substation $A^2$, through line switch C, secondary line switch D, finder switch O, and over the outgoing trunk to the tertiary line switch P in the distant exchange, which, as before mentioned, has already operated to select an idle second selector K. The called substation $A^3$ being located in the second thousand line group, the second digit of the number will be 2; and, by operating the dial at substation $A^2$ in accordance with this digit, the wipers of the second selector are raised until they stand opposite the second level, whereupon they are automatically rotated to select a trunk line leading to an idle third selector M. In the drawing, I have shown the normal wires of substation $A^3$ as extending to the third connector group, wherefore the third digit of the number may be either 5 or 6. Manipulating the dial at substation $A^2$ in accordance with one of these digits, the wipers of the first selector M are raised until they stand opposite the corresponding level, whereupon they are rotated automatically to select an idle connector N. The finder switch F with which the third selector M is connected, is now set in motion and rotates until its wipers reach the terminal of the trunk line terminating in the tertiary line switch P, this and other trunk lines being multipled in the banks of the finder switch F and other finders. A direct connection has now been established from the incoming trunk line, through the finder switch F, to the third selector M, and the second selector K may accordingly be released and made accessible to other calls.

The subscriber at substation $A^2$ may now operate his calling device in accordance with the last two digits of the desired number, whereupon the wipers of the connector N are raised and rotated until they rest upon the normal contacts of the line extending to the substation $A^3$. The line switch C′ individual to the line of the called substation $A^3$ is now operated to select an idle secondary line switch D′ which in turn is operated to locate and connect with the third selector M whereupon a direct path is established from the incoming trunk line to the called substation $A^3$ to the exclusion of the connector N which may be released and made accessible to other calls. The substation $A^2$ and the substation $A^3$ are now connected over a direct path which may be readily traced without further explanation.

I have not specified the exact number of trunk lines between the various groups as the number will vary considerably in practice, but it is to be understood that a sufficient number of such trunk lines will be provided to handle the traffic.

Referring now to Fig. 4, the automatic substation A comprises the usual receiver 2, transmitter 3, ringer 4 and condenser 5. Being an automatic substation it is also provided with a suitable impulse sending mechanism for controlling the automatic switches, which mechanism is represented diagrammatically by a pair of impulse springs 6 and 7 and an impulse wheel 8, the latter being controlled by a finger hole dial in such a way that by properly manipulating the dial the impulse wheel will separate the impulse springs a number of times corresponding to the various digits in the number of the called lines.

Each substation such as A is connected at the exchange to an individual rotary line switch C of well known type and construction. Mechanically these switches may be similar to the ones shown in the patent to Deitl No. 1,126,727. The wipers 33, 34, and 35 are intended to be rotated by the motor magnet 15 whose circuit is controlled by the line relay 13. A line switching relay 14 is provided whose function it is to connect the lines 11, 12 to the wipers at the proper time and also to open the energizing circuit of the line relay and motor magnet. The wipers 33, 34, 35 normally rest upon a set of contacts similar to 36, 37, and 38 and it is understood that each line switch C contains a plurality of such sets, corresponding sets in a number of line switches being in multiple and connected to trunk lines extending to secondary line switches such as D.

The secondary line switch D is similar to the primary line switch C except that it has a double bank of contacts and two sets of wipers, both sets being adapted, under the influence of the motor magnet, to traverse their respective banks of contacts at the same time. But one set of wipers, however, is rendered active at a given time; the set chosen depending upon the operation or non-operation of the relay 43 which in turn depends upon whether the switch is being used by a calling or by a called line. Secondary line switches D (Fig. 4) and D′ (Fig. 6) are substantially alike. Line switch D as shown, is in use from the calling substation A and has its wipers 79, 80 and 81 in service, the other set 76, 77 and 78 being dead. The active set of wipers is shown resting upon a set of contacts 85, 86 and 87, to which is connected a trunk line extending, through contacts of the relay 92, to a tertiary line switch E and also extending to multiple contacts in the bank of rotary finder switch F. Line switch D′, as shown, is in use from the called substation A′ and its wipers 76′, 77′ and 78′ are in service, the other set 79′, 80′ and 81′ being dead. The active set of wipers is shown resting upon a set of contacts 82′, 83′ and 84′, to which is connected a trunk line extending to a third selector M. It is understood that each secondary line switch D or D′ has a plurality of contact sets such as 82, 83 and 84, each set being multipled to corresponding sets in the banks of a number of other switches D or D′; and each secondary line switch D or D′ also has a plurality of contact sets such as 85, 86 and 87, each of these sets being multipled in a similar manner.

At C′ (Fig. 6) is shown a rotary line switch individual to the substation A′. Line switch C′ is similar in all respects to line switch C.

At E (Fig. 4) is shown a tertiary line switch having wipers 118, 119 and 120 adapted to be rotated by motor magnet 93 under the control of line relay 90. A line switching relay 91 and a cut off relay 92 are provided and will be described. The wipers 118, 119 and 120 rest normally upon a set of bank contacts similar to contacts 121, 122 and 123 and it is understood that each tertiary line switch E contains a plurality of such sets, each set being multipled to corresponding sets in other tertiary line switches and connected to a trunk line extending to a first selector H.

The first selector H is of the same general type of selector switch disclosed in United States Letters Patent No. 815,321, granted March 31, 1906, to Keith, Erickson and Erickson, except that the circuits are modified to enable the switch to be operated by impulses delivered over one wire and to enable impulses so delivered to be repeated ahead after the selector H has performed its function.

The selector H comprises the usual vertical and rotary magnets 130 and 131, for raising and rotating the wipers 156, 157 and 158 through the medium of a shaft (not shown) and a release magnet 128 for restoring the wipers to their normal position. Off normal contacts 145 and 146 and off normal contact 155 are closed at the first upward movement of the selector shaft and off normal contacts 144 and 146 are opened at the first upward movement of the shaft.

The switch is controlled by means of the line relay 135 which serves also to repeat impulses ahead to operate the second and third selectors.

Associated with each selector H is a battery B′, whose negative pole is connected to one wire of the incoming trunk and whose positive pole is connected to the wiper 157.

The bank contacts, as is well known, are arranged in horizontal rows or levels and, since the system in question is a multi-office system, it is to be understood that a certain level or levels will be used for trunking calls in the same office while the other levels will be used for trunking calls to other offices. The drawing shows two sets of contacts each set being in a different level. Contacts 162, 163 and 164 are multipled to corresponding contacts in other selectors and are connected to a trunk line extending to the second selector K. Contacts 159, 160 and 161 are also multipled to corresponding contacts in other selectors and are connected to a trunk line extending to a rotary finder switch O. There is of course, a plurality of sets of contacts in each level each set having multiples in other selector banks and a trunk line connected as described.

Referring to Fig. 5, the second selector K is similar to the first selector H. It has, however, four wipers instead of three and a correspondingly increased number of bank contacts in a set. There are also circuit modifications which will be mentioned latter. Each level in the second selector bank has a plurality of sets of contacts, each set being multipled in the banks of other selectors and connected to a trunk line extending to a third selector M. Individual to each second selector K is a battery $B^2$ whose positive pole is connected to the multiple bank contacts associated with second selector K and located in the banks of finder switches such as F, and whose negative pole is connected to the wiper 256 of the second selector K.

The finder switch F has three sets of wipers (274—282) adapted to be rotated in unison by the motor magnet 291 which is in series with the grouping relay 290, and is controlled by the test relay 295. I might employ but one set of wipers on the finder switch F and arrange the various sets of bank contacts all in one level, but in view of the large number of such contact sets, I prefer to arrange them in several horizontal levels, each level having its own set of wipers. In finding a certain set of contacts all the sets of wipers rotate until they rest upon the vertical row in which is located the required set of contacts, one set of wipers of course, being actually on the required set of contacts. I then select this set of wipers by means of the side switch wipers 283, 284 and 285 actuated by the private magnet 320 of the third selector M.

The third selector M is similar in its mechanical structure and mode of operation to the first selector but the circuits are modified and additional parts are provided to enable it to perform additional functions.

The wipers 410 and 411 are carried upon a shaft (not shown) and are controlled in their vertical and rotary movements by the magnets 311 and 310 respectively. A release magnet 308 is provided for restoring the side switch wipers and the shaft to their normal positions. The private magnet 320 in connection with the test relay 292 controls the side switch wipers 283, 284 and 285 in the well known manner. A calling bridge relay 302 is arranged to deliver impulses either to the vertical magnet or to the connector N and also serves to feed talking battery to the calling line. An answering bridge relay 299 reverses the calling line for purposes of supervision and also serves to feed talking battery to the called line. A ringing relay 298 is provided for signaling the called subscriber. The relay 305 has a pair of springs 364 and 365 controlled by an escapement in such a manner that when they are separated by the energization of relay 305 they will not again make contact until after two actuations of the relay 307 which controls the escapement. A busy relay 312 is provided and at the proper time connects a lead from the induction coil T to one side of the calling line. There are also provided a wiper cut-off relay 316 and a test relay 313, whose functions are sufficiently indicated by the names applied. The off-normal contacts 377 and 378, 373 and 374, and 370 and 371 are closed by the first upward movement of the shaft. The off normal contacts 370 and 372 are opened at the first upward movement of the shaft.

The bank contacts are arranged in horizontal levels in the well known manner, each set of contacts being multipled to corresponding sets in the same level in other third selectors. Although there are ten different levels there are but five groups of trunks leading to connectors N, the adjacent odd and even levels being tied together as shown. The drawing shows the first set of contacts (412, 413) in the first level and the first set of contacts (414, 415) in the second level, contacts 413 and 415 being tied together while contacts 412 and 414 are not. All the other sets of contacts in the first and second levels are connected in the same manner and form terminals of trunk lines extending to a group of connectors of which N is one. Similarly corresponding sets of contacts in the third and fourth levels have their contacts such as 413 and 415 tied together and form terminals of trunk lines extending to a second group of connectors.

The connector N is mechanically of the same general type as disclosed in U. S. Letters Patent No. 815,176 granted March 13, 1906, to Keith, Erickson and Erickson, with the exception, however, of the omission of the line relay, the omission of provision for feeding talking battery and for ringing, the addition of certain parts, and of certain circuit modifications, which are necessary to enable the switch to operate in accordance with the principles of my invention.

The wipers 451—454 are carried by a shaft (not shown) which may be raised and rotated by means of the usual vertical and rotary magnets 422 and 423. The side switch wipers 448, 449, 450 are controlled by the private magnet 427 in the usual manner. A release magnet 424 is provided for restoring the shaft and side switch wipers to their normal position. A wiper switching relay 420 is provided whose operation or non-operation depends on whether the third selector wipers are resting upon the even or odd level of bank contacts. Associated with each connector N is a battery $B^3$ whose negative pole is connected, in the third position of side switch wiper 448, to one wire of the trunk line extending from the third selector banks, and whose positive pole is connected, through contacts of relay 420, to one of the test wipers 451 or 453.

Each connector N has 200 sets of bank contacts which are in multiple with corresponding sets in other connectors of the same group and which form terminals of normal wires extending to individual line switches such as C or C′. These bank contacts are arranged in two banks each having 100 sets of contacts. In the drawing contacts 457 and 458 represent the first set of contacts of the first level of the first bank, while contacts 455 and 456 represent the first set of contacts of the first level of the second bank. The two sets of wipers 453 and 454, and 451 and 452 are moved simultaneously to engage corresponding contacts in their respective banks, but only one set of wipers is rendered effective at a given time as will be explained more fully in the detailed description of the operation.

At B (Fig. 5) I have shown a battery having one terminal grounded, the other terminal being extended to Figs. 4 and 6. At I is shown an interrupter for intermittently energizing the ringing relay 298. A busy machine S and a transformer T are provided for the purpose of indicating to a calling subscriber when a called line is busy.

The switches O (Fig. 4) and P (Fig. 5) are associated respectively with outgoing and incoming trunks extending to and from other 10,000 line exchanges. Considering first the switch P, it is most nearly like the tertiary line switch E in circuit arrangement. The wipers 212, 213 and 214 rest normally upon a set of contacts such as contacts 215, 216 and 217, these contacts being terminals of trunk lines extending to second selectors such as K. The test contact of each set, as shown in the drawing, is in multiple with corresponding test contacts in the first bank level of the first selector H, whereby it is seen that a group of line switches such as P with their banks multipled are given access to the same group of second selectors such as K as the first selector H has access to through its first bank level. The incoming trunks are multipled in the banks of the finder switches F as shown.

The switch O is a rotary finder switch similar in many respects to the finder switch F but having fewer parts. The wipers 181, 182 and 183 rest normally upon a set of contacts such as contacts 184, 185 and 186. These contacts are multipled with corresponding sets of contacts in the banks of other switches O which have terminals in the same group of first selectors H; and they also form multiple terminals of the trunk lines extending from the banks of the secondary line switches D to the banks of the finder switches F.

At R I have shown a repeater which may be of any suitable type and construction. While a repeater is not absolutely essential and has been omitted from the description of the general trunking scheme, it is very desirable in practice and I have therefore included it in the detailed description and in the circuit drawings.

I believe it has been made clear that the line and finder switches shown herein are of the single motion, rotary type in which the wipers have no normal position, although it is of course perfectly possible to practice my invention with switches of other types.

In order to avoid any erroneous conclusion as to the operativeness of the rotary switches with which I have chosen to illustrate my invention it should be explained that the wiper connections are made by means of an approved collector ring arrangement so as to allow a movement of the wipers in one direction only.

Having given a general description of the apparatus, I will now proceed to a detailed description of the operation.

Referring to Figs. 4, 5, and 6, arranged in order with the lines at the ends thereof in alinement, it will be explained how a subscriber at substation A may establish a talking connection with a subscriber at substation A′, the two substations being connected to the same 10,000 line exchange in a system embodying the principles of my invention. It will furthermore be explained how a subscriber at substation A may establish a connection with a subscriber whose station is located in a distant exchange and also how such a connection may be established in the reverse direction.

It will furthermore be explained how the connections mentioned above may be released and the apparatus restored to normal.

When the subscriber at substation A raises the receiver from the hook to initiate a call, a circuit is completed for the line relay 13 of the line switch C, said circuit extending from the ground at G′, through normally closed contact springs 21 and 22, over line 11 to substation A, whence it returns over line 12, through normally closed contact springs 19 and 18, winding of line relay 13 to battery. Upon the energization of the line relay circuits are completed for the line switching relay 14 and for the test wiper 34 which may be traced as follows: ground at G′, contact springs 29 and 30, winding of line switching relay 14, contact springs 16 and 17, winding of motor magnet 15 to battery. Test wiper 34, contact springs 25 and 24, contact springs 27 and 28, contact springs 16 and 17, winding of motor magnet 15 to battery. Current flowing in the former circuit is insufficient to effectively energize motor magnet 15 for the winding of relay 14 has high resistance. The operation now depends on the condition of the test contact upon which the test wiper is resting. If the test wiper is resting upon the test contact of an idle trunk the line switching relay will pull up at once and the motor magnet will not be operated at all; but if the test wiper is resting upon the test contact of a busy trunk, it will find ground potential and a direct short circuit will exist around the winding of the line switching relay 14. In this case the line switching relay 14 is inoperative while the motor magnet 15 is effectively energized. Since the motor magnet 15 interrupts its own circuit it continues to attract and retract its armature, thereby rotating the wipers 33, 34 and 35, until the test wiper 34 arrives at the ungrounded test contact of an idle trunk, when the rotation will cease and the line switching relay 14 will attract its armature.

By opening contact springs 18 and 19, 21 and 22 the line switching relay breaks the circuit of the line relay 13 and by closing contact springs 19 and 20, 22 and 23 completes a circuit for the line relay 41 and the wiper switching relay 43 of the secondary line switch D in series as follows: ground at $G^4$, winding 44 of relay 43, contact springs 52 and 53, bank contact 38, wiper 35, contact springs 23 and 22, subscriber's loop, contact springs 19 and 20, wiper 33, bank contact 36, contact springs 50 and 49, winding of line relay 41 to battery. Relays 41 and 43 both attract their armatures, line relay 41 completing a holding circuit for the line switching relay 14 of line switch C as follows: ground at $G^3$, contact springs 63, 62, 61 and, 60, bank contact 37, wiper 34, contact springs 25 and 26, winding of line switching relay 14 to battery. The line relay 13 is slow acting, *i. e.*, it retains its armature for an instant after its circuit is broken, thereby allowing time for the establishment of the above described holding circuit. To avoid unnecessary repetition, I will state here that the line relays of all line switches, primary, secondary and tertiary, are made slow acting for a similar reason.

A branch of the holding circuit extends over wire 32 (32′ in Fig. 6) to the connector group serving the group of lines of which the line of substation A is one, where, by placing ground potential on the multiple test contacts in the connector banks, the line of substation A is made inaccessible to incoming calls.

Returning now to the secondary line switch D, the energization of relay 43 closes the connection of the wipers 79, 80 and 81 at the contact springs 71 and 72, 68 and 69, 74 and 75 respectively. Also, in connection with the energization of the line relay 41, a locking circuit is completed for relay 43 as follows: ground at $G^3$, contact springs 63 and 62, contact springs 65 and 66, winding 45 of relay 43 to battery. The line relay 41 also completes a circuit for the line switching relay 40 as follows: ground at $G^3$, contact springs 63, 62 and 61, winding of relay 40, contact springs 46 and 47, winding of motor magnet 42 to battery. The operation that takes place now is similar to the operation of the line switch C. If the wipers are standing upon an idle trunk the line switching relay 40 pulls up at once and no rotation takes place. In case the wipers are standing upon a busy trunk the test wiper 80 will find ground potential upon the test contact, whereby the relay 40 will be short circuited and the motor magnet 43 will be energized over the following circuit: ground on test contact, wiper 80, contact springs 69 and 68, contact springs 56 and 55, contact springs 46 and 47, winding of motor magnet 42 to battery. By interrupting its own circuit at contact springs 46 and 47, motor magnet 42 vibrates its armature thereby rotating the wipers until the test wiper 80 arrives at an ungrounded test contact whereupon the rotation ceases and the line switching relay 40 attracts its armature. The energization of the line switching relay breaks the circuit of the line relay 41 and winding 44 of relay 43 by separating contacts 49 and 50, and 52 and 53 respectively; and, by closing contacts 50 and 51, 53 and 54, completes a circuit for the line relay 90 of the tertiary line switch E over the following path: ground at $G^7$, contact springs 113 and 114, bank contact 87, wiper 81, contact springs 75 and 74, contact springs 54 and 53, bank contact 38, wiper 35, contact springs 23 and 22, subscriber's loop, contact springs 19 and 20, wiper 33, bank contact 36, contact springs 50 and 51, contact springs 71 and 72, wiper 79, bank contact 85, contact springs 115 and 116, contact springs 106 and 107, winding of relay 90 to battery. This line relay 90 is energized over this circuit and, attracting its armature, completes a new holding circuit as follows: ground at $G^6$, contact springs 97 and 96, contact springs 111 and 110, bank contact 86, wiper 80, contact springs 69 and 68, to contact springs 56, 57, 58 and 59, where the circuit divides, one branch extending by way of contact spring 59, bank contact 37, wiper 34, contact springs 25 and 26, and winding of relay 14 of line switch C to battery, another branch extending by way of contact spring 58, winding of relay 40, contact springs 46 and 47, winding of motor magnet 42 to battery, while a third branch extends by way of contact spring 57, contact springs 65 and 66, winding 45 of relay 43 to battery. This holding circuit serves to maintain energized the relay 14 of the line switch C and the relays 40 and 43 of the secondary line switch D. The energization of the line relay 90 of the tertiary line switch E also completes a circuit for the line switching relay 91 and a circuit for the test wiper 118 which circuits may be traced as follows: ground at $G^6$, contact springs 97 and 98, winding of line switching relay 91, contact springs 108 and 109, winding of motor magnet 93 to battery. Test wiper 118, contact springs 101 and 102, contact springs 94 and 95, contact springs 108 and 109, winding of motor magnet 93 to battery. As in the case of the switches C and D the operation now depends on the condition of the test contact upon which the test wiper 118 is resting. If said test contact is ungrounded line switching relay 91 pulls up at once; in case said test contact is grounded relay 91 is short circuited and the motor magnet 93 is energized. Motor magnet 93 interrupts its own circuit at contact springs 108 and 109 thereby vibrating its armature and rotating the wipers until wiper 118 arrives at an ungrounded test contact, whereupon relay 91 is energized and attracts its armature.

The line switching relay 91, by separating contact springs 106 and 107 and closing contact springs 105 and 106, breaks the circuit of the line relay 90 and substitutes therefore the line relay 135 of the first selector H the new circuit extending as follows: ground at $G^7$, previously traced circuit through subscriber's loop, contact springs 115 and 116, contact springs 106 and 105, wiper 120, bank contact 123, winding of line relay 135 to battery.

Upon energizing the line relay 135 closes a circuit for the slow acting relay 129 as follows: ground at $G^{10}$, contact springs 148 and 147, winding of relay 129 to battery. Upon energizing, relay 129 prepares a circuit for the vertical magnet 130, and also completes a new holding circuit as follows: ground at $G^{11}$, contact springs 151 and 150, bank contact 121, wiper 118, contact springs 101, 100 and 99, where the circuit divides, one branch extending by way of contact spring 100 to the previously traced holding circuit of switches C and D, while the other branch extends by way of contact spring 99, winding of relay 91, contact springs 108 and 109, winding of motor magnet 93 to battery.

The line switching relay 91 also prepares a circuit for the battery B′ which should be mentioned at this time. It extends from the negative pole of battery B′ bank contact 122, wiper 119, contact springs 104 and 103, to multiple test contacts 266 and 185 in the banks of finder switches F and O respectively. The complete circuit of battery B′ will be explained later.

The foregoing circuit changes all take place in response to the removal of the receiver at substation A. We now have one side of the line grounded at $G^7$ in tertiary switch E, while the other side of the line goes through the winding of line relay 135 of the first selector H, maintaining relay 135 energized and, by means of relay 129, controlling a common holding circuit for line switch C, secondary line switch D, and tertiary line switch E.

The subscriber at A may now manipulate his finger dial in accordance with the first digit of the number assigned to substation A′, which, since it was assumed that substation A and A′ are both in the first 10,000 line exchange, is 1. In response to the operation of the finger dial the impulse wheel 8 separates the springs 6 and 7 momentarily, thereby deënergizing line relay 135 of the first selector H for an instant. Upon retracting its armature, line relay 135 closes a circuit for the vertical magnet 130 as follows: ground at $G^{10}$, contact springs 148 and 149, contact springs 153 and 152, off normal springs 146 and 144, winding of slow acting relay 127, winding of vertical magnet 130 to battery. The vertical magnet and the slow acting relay 127 are energized in series over the foregoing circuit, the former raising the wipers opposite the first level of bank contacts, and the latter completing a circuit for the relay 126 as follows: ground at $G^9$, contact springs 141 and 142, winding of relay 126 to battery. Relay 126, in attracting its armature, completes a new circuit for the vertical magnet, the original circuit being opened an instant later by the separation of the off normal springs 144 and 146 at the first vertical movement of the shaft. The substitute circuit extends from ground at $G^{10}$, contact springs 148 and 149, contact springs 153 and 152, off normal springs 146 and 145; contact springs 139 and 138, winding of slow acting relay 127, winding of vertical magnet 130 to battery. Relay 126 also completes a locking circuit for itself as follows: ground at $G^{11}$, contact springs 151 and 150, contact 134, contact springs 137 and 136, winding of relay 126 to battery.

The line relay 135 again attracting its armature at the end of the impulse, the circuit of slow acting relay 127 is broken and an instant later it retracts its armature thereby closing a circuit for the rotary magnet 131 which may be traced as follows: ground at $G^{11}$, contact springs 151 and 150, contact 134, contact springs 137 and 136, contact springs 142 and 143, contact 133, winding of rotary magnet 131 to battery. The rotary magnet attracts its armature 132 and rotates the shaft one step so that the wipers 156, 157 and 158 make connection with the first set of bank contacts of the first level. Near the end of its stroke the armature 132 opens the contacts 133 and 134 thereby breaking the circuit of the rotary magnet and the locking circuit of relay 126. The rotary armature, accordingly, falls back; but the deenergization of the relay 126 depends on the condition of the test contact upon which the test wiper 156 is now resting. If the trunk with which this test contact is associated is busy, the test contact will have ground potential upon it and a holding circuit for the relay 126 will exist as follows: ground on test contact, test wiper 156, contact springs 137 and 136, winding of relay 126 to battery. Then the relay 126 will remain energized and, as the rotary armature returns to normal position and closes the contacts 133 and 134, the rotary magnet will again be energized and will move the wipers 156, 157 and 158 into connection with the second set of contacts of the first level. In this manner the wipers will continue to be rotated until they reach an idle trunk as indicated by absence of ground on the test contact. This time when the contact 134 opens the relay 126 falls back, thereby opening its own locking circuit and also opening the rotary magnet circuit whereupon the wipers 156, 157 and 158 will be brought to rest upon the set of contacts 162, 163 and 164 of an idle trunk line extending to a second selector K. As a further result of the deenergization of relay 126 the impulse circuit extending from the contact springs 149 of line relay 135 is switched at contact springs 138, 139 and 140 from the vertical magnet 130 to the vertical magnet 220 of the second selector K. We will now trace a circuit for the relay 224 of the second selector K as follows: ground at $G^{11}$, contact springs 151 and 150, contact 134, wiper 156, bank contact 162, contact springs 247 and 248, winding of relay 224 to battery. By separating contact springs 254 and 263 and closing contact springs 253 and 254, relay 224 switches a circuit completed later by the off normal contact 252, from the release magnet 225, to contact 230. This circuit will be referred to again. The connection of ground from $G^{11}$ to multiple test contacts 162 and 215, also serves to make the second selector K busy to other first selectors and to the tertiary line switches P. The subscriber at substation A may now manipulate his finger dial in accordance with the second digit of the desired number, assumed in this case to be 3, thereby momentarily separating the impulse springs 6 and 7 three times. As a result the line relay 135 is deenergized three times and sends three impulses to the vertical magnet 220 of the second selector K over the following path: ground at $G^{10}$, contact springs 148 and 149, contact springs 153 and 152, off normal springs 146 and 145, contact springs 139 and 140, wiper 158, bank contact 164, off normal contacts 239 and 237 of the second selector K, winding of slow acting relay 223, winding of vertical magnet 220 to battery. Impulses over the foregoing circuit energize the vertical magnet 220 and the slow acting relay 223 in series, the former vibrating its armature in response to the impulses and thereby raising the wipers 255, 256, 257 and 258 until they stand opposite the third level. The slow acting relay 223 retains its armature in its operated position during the series of impulses and completes an initial energizing circuit for relay 222, which relay locks itself over the following circuit: ground at $G^{14}$, contact springs 244 and 243, contact springs 250 and 251, off normal contact 252, contact springs 254 and 253, contact 230, contact springs 232 and 231, winding of relay 222 to battery. At the end of the series of impulses, relay 223 retracts its armature thereby completing a circuit for the rotary magnet which may be traced as a branch of the above locking circuit as follows: contact spring 231, contact springs 241 and 242, contact 229, winding of rotary magnet 221 to battery. The operation of selecting an idle trunk has been fully described in the case of the first selector H and need not be repeated. It will suffice to say here that the rotary magnet interrupts its own circuit at contact 229 and continues to rotate the wipers until the test wiper 255 arrives at an ungrounded test contact when Draftsman

18 the relay 222 is deenergized and the rotation stopped with the wipers 225—258 in engagement with the contacts of a trunk line extending to a third selector M.

We will now trace an energizing circuit for the relay 305 of the third selector M which was completed by the deenergization of relay 222. Said circuit extends from ground at $G^{14}$, through contact springs 244 and 243, contact springs 250 and 251, off normal contact 252, contact springs 254 and 253, contact 230, wiper 255, bank contact 259, contact springs 358 and 359 (third selector M), winding of relay 305 to battery. Relay 305 energizes and opens the circuit of the release magnet 308 and also a test circuit which will be referred to later.

A branch of the above circuit may be traced as follows: contact 230, contact springs 232 and 233, wiper 257, bank contact 261, contact springs 327 and 326 (finder switch F), contact springs 337 and 338, contact springs 325 and 324, winding of motor magnet 291 of finder switch F, winding of relay 290 to battery. The motor magnet 291 and the relay 290 are energized over the above circuit, the former interrupting its own circuit at contact springs 324 and 325, thereby vibrating its armature and causing wipers 274—282 to traverse their respective rows of bank contact; and the latter, by closing contact springs 322 and 323, completing a circuit for the test wipers 275, 278 and 281 as follows: positive pole of battery B′ (Fig. 4), wiper 157, bank contact 163, wiper 256, bank contact 260, winding 296 of test relay 295, contact springs 322 and 323, to test wipers 275, 278 and 281. The negative pole of battery B′ has already been traced through contacts in tertiary line switch E to the test contact 266 and its multiple contacts in the banks of finder switch F and other finders. It is evident, therefore; that when the test wiper 275 arrives at the test contact 266 the circuit of the battery B′ will be completed through the winding 296 of test relay 295. Test relay 295 attracts its armature and by separating contact springs 337 and 338, interposes its own high resistance winding 297 in the circuit of motor magnet 291 and relay 290 thereby locking itself and causing motor magnet 291 and relay 290 to become inoperative. The rotation of the wipers accordingly stops with wipers 274, 275 and 276 resting upon bank contacts 265, 266 and 267, these contacts being the multiple terminals of the trunk line selected by the secondary line switch D. Wipers 277, 278 and 279 remain open for the present at the side switch contacts.

The subscriber at substation A may now call the third digit of the desired number which is 1, resulting in a momentary deenergization of line relay 135 of the first selector H, which sends an impulse to the vertical magnet of the third selector M over the following path: ground at $G^{10}$, contact springs 148 and 149, contact springs 153 and 152, off normal springs 146 and 145, contact springs 139 and 140, wiper 158, bank contact 164, off normal springs 239 and 238 of second selector K, contact springs 235 and 236, wiper 258, bank contact 262, contact springs 331 and 330, winding of slow acting relay 309, winding of vertical magnet 311 to battery. The vertical magnet 311 and the slow acting relay 309 are energized over this circuit, the former raising the wipers 410 and 411 until they stand opposite the first level and the latter closing a circuit for the relay 319 and relay 316 as follows: ground at $G^{20}$, contact springs 383 and 382, winding of relay 319, winding 318 of relay 316 to battery. Upon energizing, relay 319 completes a locking circuit for itself and relay 316 which may be traced as a branch of the holding circuit of relay 305 extending from ground at $G^{14}$. The branch circuit extends from contact spring 358, through contact 375, contact springs 386 and 387, winding of relay 319, winding 318 of relay 316 to battery. Relay 316 upon energizing, connects up the wipers 410 and 411.

At the end of the impulse the slow acting relay 309 deenergizes and completes a circuit for the rotary magnet 310 which may be traced as a branch of the above described locking circuit of relay 319 as follows: contact spring 387, contact springs 382 and 381, contact 376, winding of rotary magnet 310 to battery. Rotary magnet 310 is energized over this circuit and attracts its armature 321 thereby rotating the wipers 410 and 411 until they engage the first set of contacts of the first level. Near the end of its stroke the rotary armature 321 breaks the contacts 375 and 376 thereby opening the rotary magnet circuit and the locking circuit of relays 319 and 316. The rotary magnet deenergizes and retracts its armature but the deenergization of relays 319 and 316 depends upon the condition of the test contact upon which the test wiper 410 is now resting. If the trunk with which this test contact is associated is busy it will have ground potential upon it and a holding circuit for relays 319 and 316 will be effective over the following path: ground on test contact, test wiper 410, contact springs 402 and 403, winding 317 of relay 316, contact springs 395 and 396, contact springs 386 and 387, winding of relay 319, winding 318 of relay 316 to battery. It is evident, therefore, that as long as the test wiper 410 engages grounded test contacts the relays 319 and 316 will remain energized and rotary magnet 310 will continue rotating the wipers until an ungrounded test contact is reached. Then, as contact 375 opens, relay 319 deenergizes, breaking the rotary magnet circuit and stopping the rotation. Relay 316, however, does not deënergize but is locked over a new circuit which may be traced as another branch of the holding circuit of relay 305 as follows: contact spring 358, contact 375, contact springs 396 and 395, winding 317 of relay 316, contact springs 403 and 402, wiper 410, contact 412, winding of relay 420 of connector N, contact springs 439 and 440, winding of relay 421 to battery.

Before continuing with the operation of connector N it will be necessary to return and consider the operation of the side switch wipers 283, 284 and 285. At the end of the impulse or series of impulses which operate the vertical magnet of third selector M, the slow acting relay 309 retracts its armature and completes, in addition to the rotary magnet circuit already described, a circuit for the private magnet 320 which may be traced as a branch of the locking circuit of relay 295 as follows: contact springs 337 and 336, contact springs 379 and 380, contact springs 388 and 389, winding of private magnet 320, off normal springs 378 and 377 (closed at first movement of shaft) to battery. The private magnet interrupts its own circuit at contact springs 388 and 389 and is made slow acting so as not to work too fast. At each deenergization of the private magnet its side switch wipers 283, 284, and 285 are shifted to their next position in the well known manner. When the side switch levers reach their second position the circuit of battery B′ will again be completed over the same path as before except that winding 293 of test relay 292 and side switch wiper 284 are substituted for winding 296 of test relay 295 and contact springs 322 and 323. The test relay 292 is energized over the above circuit and attracts its armature, thereby separating contact springs 326 and 327, breaking the locking circuit of relay 295, and interposing its own high resistance winding 294 in the circuit of the private magnet 320, thereby locking itself and causing the private magnet to become inoperative, the side switch levers remaining in their second position. By bringing contact springs 332 and 334 into engagement with contact springs 333 and 335, respectively, test relay 292 completes the circuit of the double wound line relay 302 of third selector M over the following path: ground at $G^{18}$, winding 303 of line relay 302, contact springs 346 and 347, contact springs 334 and 335, side switch wiper 285 in its second position, wiper 276, bank contact 267, previously traced circuit through subscriber's loop, bank contact 265, wiper 274, side switch wiper 283 in its second position, contact springs 332 and 333, contact springs 344 and 343, winding 304 of line relay 302 to battery. The line relay 302 energizes over the above circuit and, attracting its armature, completes the circuit of slow acting relay 306 as follows: ground at $G^{19}$, contact springs 356 and 355, contact springs 390 and 391, contact springs 400 and 399, winding of relay 306 to battery. It will be noticed that that part of the circuit which includes the contact springs 390 and 391 and contact springs 399 and 400 forms a shunt circuit around the busy test relay 312.

Referring again to test relay 292, by closing contact springs 327 and 328 a branch of the locking circuit of winding 294 is completed as follows: contact springs 327 and 328, side switch wiper 284, wiper 275, bank contact 266, winding of relay 92 (Fig. 4) to battery. Relay 92, attracting its armature, closes contact springs 110 and 112 and separates contact springs 110 and 111, thereby disconnecting ground at $G^{11}$ from the holding circuit extending to the line switches C and D and substituting therefor ground over the previously described energizing circuit of relay 92. Relay 92 also separates contact springs 113 and 114 and contact springs 115 and 116, thereby removing ground at $G^{7}$ from one side of the trunk line and disconnecting the other side of the trunk line from the line relay 135 of the first selector H.

Upon the deenergization of line relay 135, the circuit of slow acting relay 129 is broken and it deenergizes, closing contact springs 153 and 154 and thereby energizing the release magnet 128 which restores the first selector to its normal position in the well known manner. The deenergization of relay 129 also separates contact springs 150 and 151 thereby breaking the holding circuits extending to line switching relay 91 of tertiary line switch E and relay 224 of second selector K. The deenergization of line switching relay 91 disconnects the wipers 118, 119 and 120, thereby freeing the trunk line to the first selector H and making its accessible to other calls.

The relay 224, upon deenergizing, closes contact springs 254 and 263 thereby completing the circuit of the release magnet 225 which energizes and restores the second selector to its normal position in the well known manner. The separation of springs 253 and 254 of relay 224 disconnects ground at $G^{14}$ from two holding circuits extending to contact springs 358 and 327, respectively, where they have been previously traced. These holding circuits, however, have already been connected together at contact springs 327, 328 and 329 and to ground at $G^{19}$ by the energization of slow acting relay 306 and consequently they remain effective.

The slow acting relay 306, when energized upon the operation of line relay 302 as previously described, separated the contact springs 361 and 362 and contact springs 358 and 359, the former opening the circuit of the release magnet 308 at a new point and the latter breaking the circuit of the relay 305 which deenergizes. Upon the deenergization of relay 305, contact springs 367 and 368 are closed but contact springs 364 and 365 are held open by the engagement of finger 366 with the escapement 363 controlled by slow acting relay 307.

To sum up the operations so far, the calling line has been extended through primary line switch C, secondary line switch D, and finder switch F to the line relay 302 of the third selector M. The third selector M has been operated, by way of the first selector H and the second selector K to select a trunk line to an idle connector N and these selector switches have been restored to normal.

The subscriber at substation A may now operate his dial in accordance with the fourth digit of the desired number thereby breaking the continuity of his loop a number of times at the impulse springs 6 and 7. As a result the line relay 302 of the third selector M is momentarily deenergized a corresponding number of times and sends a series of impulses to the vertical magnet 422 of the connector N over the following path: ground at $G^{19}$, contact springs 355 and 354, contact springs 361 and 360, winding of slow acting relay 307, contact springs 405 and 404, wiper 411, bank contact 413, side switch wiper 448 in its first position, winding of vertical magnet 422, winding of the slow acting relay 426 to battery. The vertical magnet operates in response to these impulses to raise the two sets of wipers 451—452 and 453—454 until the latter set stands opposite the tens level in which are located the normal contacts of the desired line. Slow acting relays 307 and 426 are energized in series with the vertical magnet and retain their armatures during the series of impulses.

Relay 426 completes an energizing circuit for the private magnet which is broken at the end of the series of impulses thereby allowing the side switch wipers 448, 449, and 450 to move to their second position in the well known manner. The operation of the relay 307 allows the finger 366 to move one step past the escapement 363.

The subscriber at substation A may now operate his dial in accordance with the last digit of the desired number resulting as before in separating the springs 7 and 8 a corresponding number of times. The line relay 302, in response to these interruptions of its circuit, now sends a series of impulses to the rotary magnet 423 (side switch wiper 448 being in its second position) the relays 307 and 426 being included in the circuit as before. The rotary magnet 423 responds to these impulses by rotating the two sets of wipers a number of steps corresponding to the last digit of the desired number when the wipers 453 and 454 will rest upon the normal contacts of the desired line. It is understood that the other set of wipers 451 and 452 are also resting upon the same numbered contacts in the other bank but these wipers are disconnected by the wiper switching relay 420. If the wipers of the third selector had been raised to the second level instead of the first the wiper switching relay 420 would not have operated and the set of wipers 451 and 452 would be left in service.

Now at the end of the last series of impulses the slow acting relay 426 retracts its armature deenergizing the private magnet (assuming the called line to be idle) and allowing the side switch wipers 448, 449 and 450 to move to their third position. Also the slow acting relay 307 retracts its armature, operating the escapement 363 and allowing the contact springs 364 and 365 to close. We may now trace the negative pole of battery $B^3$ through side switch wiper 448 in its third position, bank contact 413, wiper 411, contact springs 404 and 405, winding 315 of relay 313, contact springs 365 and 364, to test contact 83′ and multiple test contacts in the banks of secondary line switches D′ and similar secondary switches. It will be shown later on how this circuit is completed to the other pole of battery $B^3$.

We may now trace two circuits extending over the normal wires 31′ and 32, to the line switch C′. The first of these to become operatively effective extends from the ground at $G^{25}$, through contact springs 435 and 434, contact springs 429 and 430, side switch wiper 449 in third position, wiper 454, bank contact 458, normal wire 31′ to one side of the line of substation A′ whence it passes by way of contact springs 19′ and 18′ and the winding of line relay 13′ to battery. The line relay 13′ is energized over the above circuit whereupon the line switch C′ operates to rotate its wipers 33′, 34′ and 35′ until they rest upon contacts of a trunk line leading to an idle secondary line switch D′. The operation is the same as that already described in the case of the line switch C. A holding circuit for the line switching relay 14′ may be traced from the connector N as follows: ground at $G^{27}$, contact springs 447 and 446, contact springs 444 and 443, resistance $r'$, contact springs 432 and 433, wiper 453, bank contact 457, normal wire 32′, winding of line switching relay 14′ to battery. It should be mentioned here that while the two normal wires are grounded at almost the same instant, the line relay 13′ pulls up first because the line switching relay 14′ has its springs adjusted very stiff so that it will not operate until the core becomes nearly saturated.

The lines of substation A′ and the normal wire 32′ have now been extended to secondary line switch D′. Bearing in mind the fact that the two normal wires are still grounded at the connector N, a circuit for the line relay 41′ of secondary line switch D′ may be traced as follows: ground on normal wire 31′, contact springs 19′ and 20′, wiper 33′, bank contact 36′, contact springs 50′ and 49′, winding of line relay 41′ to battery. A branch of the above circuit goes through winding of motor magnet 42′ over the following path: contact springs 50′, 49′ and 48′ contact springs 67′ and 68′, contact springs 56′ and 55′, contact springs 46′ and 47′, winding of motor magnet 42′ to battery.

The line relay 41′ and the motor magnet 42′ are energized over the above circuit, whereupon the switch starts rotating in search of the trunk extending to the third selector M. It will be seen that, inasmuch as the secondary switch D′ is being operated by a ground on the negative line 12′, no current will flow in the winding 44′ of the relay 43′ and this is true even if the subscriber at A′ should remove his receiver while switch D′ is rotating. Consequently relay 43′ is inoperative and the wipers 76′, 77′ and 78′, are made active while wipers 79′, 80′, and 81′ (used in the case of the calling secondary switch D) remain disconnected.

We may now trace a circuit of the positive pole of battery $B^3$ as follows: positive pole of battery $B^3$, contact springs 432 and 433, wiper 453, bank contact 457, contact springs 26′ and 25′, wiper 34′, bank contact 37′, contact spring 59′, contact springs 60′, 61′ and 62′, contact springs 65′ and 64′ to test wiper 77′. The negative pole of battery $B^3$ has already been placed to the multiple test contacts such as 83′ of the trunk leading to third selector M. When, therefore, the test wiper 77′ arrives at the contact 83′ the circuit of battery $B^3$ will be completed through winding 315 of relay 313 of the third selector M. Relay 313 energizes over the above circuit and locks itself through its high resistance winding 314 as follows: ground at $G^{19}$, contact springs 357 and 358, contact 375, contact springs 396 and 394, contact springs 341 and 340, winding 314 of relay 313 to battery. By separating contact springs 395 and 396, relay 313 breaks the circuit of winding 317 of relay 316, relay 420, and relay 421.

Relay 421, by retracting its armature, removes ground from side switch wiper 449 thereby stopping the rotation of secondary line switch D′ and allowing line switching relay 40′ to energize (since it is no longer short circuited) and lock itself over a holding circuit extending from the third selector over the following path: ground at $G^{19}$, contact springs 357 and 358, resistance *r*, bank contact 83′, wiper 77′, contact springs 64′ and 65′, contact springs 57′ and 58′, winding of line switching relay 40′ to battery. A branch of the above holding circuit may be traced from contact springs 57′, 58′ and 59′, by way of bank contact 37′, wiper 34′, contact springs 25′ and 26′, and winding of line switching relay 14′ to battery. Another branch extends, as already explained, over normal wire 32′ to multiple test contacts such as 457 where, after connector N is released, the line of substation A′ is made busy to other calls. The release of the connector N takes place as soon as the relay 421, by retracing its armature, completes the circuit of the release magnet 424. The release magnet 424 upon energizing, restores the side switch wipers 448, 449 and 450, and the shaft to their normal position in the regular manner. Furthermore the connector N is made accessible to other calls by the deenergization of relay 316 whereby the third selector wipers 410 and 411 are disconnected.

The line of substation A′ has now been extended through the medium of line switch C′ and secondary line switch D′, to the third selector M where there is bridged across it the double wound back bridge relay 299 in series with the battery as follows: ground at $G^{17}$, winding 301 of relay 299, contact springs 353 and 352, bank contact 84′ wiper 78′, contact springs 73′ and 74′, contact springs 54′ and 53′, bank contact 38′, wiper 35′, contact springs 23′ and 22′, wire 11′, through subscriber's loop, wire 12′, contact springs 19′ and 20′, wiper 33′, bank contact 36′, contact springs 50′ and 51′, contact springs 71′ and 70′, wiper 76′, bank contact 82′, contact springs 349 and 350, winding 300 of relay 299 to battery. This is the circuit over which talking battery is fed to substation A′, although, since the receiver is on the hook, no current will flow as yet.

We may now trace a circuit for the ringing relay 298 which was closed by the relay 313. This circuit extends from ground at $G^{21}$, through interrupter I, contact springs 397 and 398, winding of ringing relay 298 to battery. The ringing relay is energized intermittently and operates to disconnect the line of the called substation from the back bridge relay and to connect it with the ringing current generator Gen for the purpose of signaling the called subscriber.

When the subscriber at substation A′ removes his receiver from the hook, the ringing relay being momentarily inactive, the previously described circuit of the back bridge relay 299 is completed and the said relay attracts its armature thereby reversing the line of substation A at springs 342—347 and breaking the locking circuit of relay 313 at contact springs 340 and 341. Relay 313 thereupon deenergizes and opens the circuit of the ringing relay at contact springs 397 and 398.

A complete talking circuit has now been established between the substation A and the substation A′ and is indicated in the drawings by the heavy lines. The connection is controlled by the calling subscriber by means of relay 302 which in turn controls relay 306 which, by holding contact springs 357 and 358 together, supplies a holding ground to all the switches in multiple over circuits which have been explained.

The restoration of all the apparatus to normal may be accomplished by hanging up the receiver at substation A thereby breaking the circuit of line relay 302. Line relay 302 deenergizes and opens the circuit of slow acting relay 306, which deenergizes in its turn and, by separating contact springs 357 and 358, removes the holding ground extending to finder switch F, tertiary switch E, secondary line switch D, primary line switch C, secondary line switch D′, and primary line switch C′, whereupon the several relays locked up in these switches are deenergized. Also, by closing contact springs 361 and 362, the circuit of the release magnet 308 is completed, resulting in the restoration of the side switch wipers and the shaft of the third selector M, to their normal position in the well known manner. Whereupon all the apparatus will have been returned to normal and made ready for use in extending another connection.

I will now describe briefly the operations that take place when the called line is busy. It has been explained how at the end of the last series of impulses sent to the connector N the wipers 453 and 454 will be brought into engagement with bank contacts 457 and 458 these being the normal contacts of the line extending to substation A′. Now if the line of substation A′ is busy, test contact 457 will have ground potential upon it, whereby, upon the deenergization of slow acting relay 426, a locking circuit is established for the private magnet 427 as follows: ground on test contact, wiper 453, contact springs 433 and 432, resistance $r'$, contact springs 433 and 434, contact springs 446 and 445, winding of relay 425, winding of private magnet 427 to battery. The private magnet remains energized over this circuit thereby holding the side switch wipers in their second position. Relay 425 is energized in series with the private magnet and, by separating its contact springs 439 and 440, breaks the circuit of relays 421, 420 and 316. Upon the deenergization of relay 421, the circuit of the release magnet 424 is completed and the connector N is restored to normal. Upon the deenergization of relay 316 the shunt path around busy relay 312 is broken momentarily by the separation of contact springs 399 and 400. (relay 313 being in a deenergized condition). Relay 312 thereupon is energized in series with relay 306 and, attracting its armature, immediately opens the aforementioned shunt circuit at a new point by separating contact springs 390 and 391. It may be explained here that contact springs 390 and 391 are opened before contact springs 400 and 401 close. Relay 312 is now locked up in series with relay 306. A distinctive tone from the transformer T and busy machine S is now projected out over one side of the calling line by the closure of contact springs 392 and 393, whereby the calling subscriber is informed that the desired line is busy and therefore inaccessible for the time being. The calling subscriber may now hang up his receiver, thereby bringing about the restoration of the apparatus to normal in a manner substantially as previously described.

I will now describe the operation of trunking between two 10,000 line exchanges. Each interoffice trunk has at its outgoing end a repeater R and finder switch O, and at its incoming end a line switch P. The finder switches O have access to the trunks extending from the banks of secondary line switches D to the banks of finder switches F, and are themselves accessible to first selectors such as H. The line switches P have access to second selectors such as K and are themselves accessible to finder switches F.

Referring to Figs. 4, 5 and 6 we will assume that the apparatus shown in Fig. 4 is located in one exchange and the apparatus shown in Figs. 5 and 6 in another exchange, and we will furthermore assume that the outgoing trunk shown near the lower right hand corner of Fig. 4 terminates in the incoming trunk shown in the lower left hand corner of Fig. 6. This trunk is indicated at its outgoing and incoming ends by reference characters 520 and 521. In the following description I will cover in detail only that portion of the operation which differs from the operation already described.

When the subscriber at substation A removes his receiver he is connected through the successive operations of line switches C, D, and E with the first selector H. He may now operate his dial in accordance with the first digit of the desired number which is 2, whereupon the wipers of the first selector H are raised until they stand opposite the second level and are then automatically rotated to select an idle finger switch O. The engagement of wiper 156 with bank contact 159 completes the following circuit: ground at $G^{11}$, contact springs 151 and 150, contact 134, wiper 156, bank contact 159, winding 170 of relay 168, contact springs 180 and 179, winding of motor magnet 167 to battery. The winding 170, however, is short-circuited for the time being by contact springs 177 and 178. The motor magnet 167 is energized and starts rotating the wipers 181, 182, and 183 in search of the trunk line upon which the active wipers of secondary line switch D are resting. It has been previously explained how the negative pole of battery B′ is connected through tertiary line switch E to the test contact 185 and its multiple test contacts. The positive pole of battery B′ may now be traced by way of wiper 157, bank contact 160, winding 169 of relay 168 to test wiper 182. It is evident, therefore, that when the test wiper 182 arrives at test contact 185 the circuit of battery B′ will be completed through winding 169 of relay 168. Relay 168 energizes over the above circuit and, by separating contact springs 177 and 178, interposes its high resistance winding 170 in the circuit of the rotary magnet thereby locking itself and stopping the rotation with the wipers 181, 182, and 183 resting on contacts 184, 185 and 186, respectively.

By bringing contact springs 171 and 173 into engagement with contact springs 172 and 174, respectively, relay 168 completes the circuit of the line relay 500 of the repeater R as follows: ground at $G^{51}$, winding 502 of line relay 500, contact springs 174 and 173, wiper 181, contact 184, previously traced circuit including substation A, bank contact 186, wiper 183, contact springs 171 and 172, winding 501 of line relay 500 to battery. Line relay 500 is energized over the above circuit and completes an energizing circuit for slow acting relay 507. Relay 507 attracts its armature and completes a circuit for relay 92 of tertiary line switch E as follows: ground at $G^{50}$, contact springs 509 and 508, contact springs 176 and 175, wiper 182, bank contact 185, winding of relay 92 to battery. Relay 92 attracts its armature whereupon the first selector H is released and line switching relay 91 is deenergized all substantially as previously described. A holding circuit may now be traced from ground at $G^{50}$, by way of contact springs 509 and 508 to contact spring 176, where it divides, one branch extending by way of contact spring 177 and winding 170 of relay 168 to battery, and the other branch extending by way of contact 175, wiper 182, and bank contact 185 to contact spring 112, where it also divides, one branch extending through winding of relay 92 to battery and the other branch extending by way of contact springs 112 and 110 to line switches D and C over a path which has been previously traced.

Upon the energization of line relay 500 a circuit is also completed for the slow acting line relay 190 of the line switch P of the distant exchange over the following path: ground at $G^{12}$, contact springs 208 and 209, wire 520, winding of retardation coil 510, contact springs 503 and 504, other winding of retardation coil 510, wire 521, contact springs 210 and 211, contact springs 204 and 205, winding of line relay 190 to battery. The slow acting line relay 190, upon attracting its armature, completes a circuit for the line switching relay 191 and a circuit for the test wiper 212, the former extending from ground at $G^{13}$, by way of contact springs 196 and 197, winding of relay 191, contact springs 206 and 207 and winding of motor magnet 192 to battery; and the latter extending from test wiper 212, by way of contact springs 199 and 200, and contact springs 195 and 194 to contact spring 206 where the two circuits join. In case the test wiper 212 is resting upon the test contact of a busy trunk line it will find ground potential there, and the circuit of the test wiper will act as a short circuit for the relay 191, providing at the same time a direct ground for the motor magnet 192. The motor magnet 192 thereupon operates to rotate the wipers 212, 213 and 214 until the test wiper 212 arrives at an ungrounded test contact when the motor magnet will cease operating and the line switching relay 191, no longer being short-circuited, will attract its armature.

A circuit has now been established for the line relay 227 of the second selector K over the following path: ground at $G^{12}$, contact springs 208 and 209, previously traced circuit over wires 520 and 521, contact springs 210 and 211, contact springs 204 and 203, wiper 214, bank contact 217, winding of line relay 227 to battery. The line relay 227 is energized over the above circuit and, by closing contact springs 244 and 245, completes an energizing circuit for slow acting relay 226 which relay, upon attracting its armature, completes a holding circuit for relay 191 of line switch P as follows: ground at $G^{55}$, contact springs 246, 264, and 247, bank contact 215, wiper 212, contact springs 199 and 198, winding of relay 191 to battery.

The subscriber at substation A is now connected with a second selector K in the distant exchange and may operate his dial for the second figure of his number. The operation of the second selector has been described and is the same in this case, except that the relay 224 remains deënergized owing to the energization of relay 226, and further, that impulses are delivered to the vertical magnet by the line relay 227 of the second selector instead or by the line relay 135 of the first selector. In view of the detailed description which has been previously given it is thought that the operation from now on will be perfectly clear. Impulses are sent to the vertical magnet of the Draftsman

18 third selector by the line relay 227 whereby the third selector is operated to select a connector N in the proper group. At the same time the finder F is operated to locate and connect with the incoming trunk, the battery $B^2$ providing current for energizing the test relays 295 and 292 in a manner similar to that described in the case of battery B'. When the finder switch F has connected with the incoming trunk relay 193 of the line switch P is energized over a holding circuit from the third selector M, whereupon the second selector K is released and the line switching relay 291 is deenergized. The operation from now on is identical with that which has been described and requires no further mention. It is understood that connections as described in the foregoing pages may be established from any exchange in the system to any other exchange in the system, each exchange being provided with equipment for extending such connections and for completing connections so extended.

It will be seen that I have provided an extremely efficient automatic telephone trunking system for giving service to subscribers in a plurality of exchanges, the high degree of efficiency being largely due to the fact that a considerable portion of the apparatus is at once made available for other calls after it has performed its function in establishing a connection. While I have described one form in which my invention may be practiced it is probable that modifications will suggest themselves to those skilled in the art. I do not, therefore, wish to be strictly held to the embodiment shown herein, but desire rather to include and have protected by Letters Patent all modifications which may come within the scope of the appended claims.

What I claim as my invention is:

1. In a telephone trunking system, a central exchange comprising a plurality of lines, means accessible to a calling line and comprising a plurality of numerical trunking switches brought into use consecutively for locating a called line, and means including a non-numerical switch for establishing a direct path around certain of said numerical switches before the others are operated, whereby one of said switches may be rendered available for further calls while the calling and called lines are connected.

2. In a telephone trunking system, means comprising a plurality of serially related numerical trunking switches for connecting calling and called lines, and means for eliminating said switches in two or more successive stages to render them available for other calls without interfering with the process of connection.

3. In a telephone trunking system, a plurality of lines, a plurality of serially related numerical trunking switches, means controllable over a calling line for operating said switches successively to locate a called line, and means for successively eliminating said switches to render them available for other calls without interfering with the operation of succeeding switches.

4. In a telephone trunking system, a plurality of lines, a plurality of serially related numerical trunking switches, means controllable over a calling line for operating said switches successively to locate a called line, means operated automatically during the location of the called line for building up a direct connection thereto in sections, and means operated after each section is completed, for releasing certain of said trunking switches.

5. In a telephone trunking system, a central exchange comprising a plurality of lines, means accessible to a calling line and comprising a plurality of serially related numerical trunking switches for locating a called line, and a non-numerical switch for establishing a direct path around a plurality of said numerical switches before the others are operated.

6. In a telephone trunking system, a plurality of subscribers' lines, means including parallel groups of trunk lines for connecting calling and called subscribers' lines, an automatic trunking switch controllable over a calling subscriber's line for selecting a wanted group of trunk lines and an idle trunk line in the selected group, and a backward selecting finder switch associated with the selected idle trunk line operable automatically to establish a direct path around the said trunking switch.

7. In a telephone trunking system, a plurality of subscribers' lines, means including parallel groups of trunk lines for connecting calling and called subscribers' lines, an automatic trunking switch controllable over a calling subscriber's line for selecting a wanted group of trunk lines and an idle trunk line in the selected group, a backward selecting finder switch associated with the selected idle trunk line operable automatically to establish a direct path around the said trunking switch, additional automatic switches for completing the connection to the called line, and means for restoring said trunking switch to idle condition and for then operating said additional switches over the said direct path.

8. In a telephone trunking system, a plurality of lines, a plurality of serially related numerical trunking switches, means controllable over a calling line for operating said switches successively to locate a called line, means operated automatically during the location of the called line for building up a direct connection thereto in sections, and means operated after each section is completed for releasing certain of said trunking switches, whereby said trunking switches are made available for use in building up other connections.

9. In a telephone trunking system, a plurality of lines, a plurality of serially related trunking switches for establishing a talking connection between calling and called lines, a plurality of serially related numerical trunking switches for controlling the establishment of said talking connection, means for operating switches in both series alternately whereby such connection may be established, and means for releasing the switches of said second series independent of those in the first series to make them available for use in building up other connections.

10. In a telephone trunking system, a plurality of lines, a plurality of serially related trunking switches for connecting calling and called lines, a plurality of serially related numerical trunking switches for controlling said connecting operation, means controlled by a calling line for operating switches of said second series successively to select a called line, automatic means for operating switches of said first series at intervals between successive operations of said second series whereby a connection is established between the said calling and called lines, and means effective without destroying said connection for releasing the switches of said second series to make them available for use in building up other connections.

11. In a telephone trunking system, a plurality of lines terminating in a central exchange, a second central exchange, trunk lines between said exchanges, a selector switch accessible to a calling line in said first exchange for selecting an idle one of said trunk lines, and an automatic switch individual to each of said trunk lines whereby the one selected may be connected with the said calling line independent of said selector switch.

12. In a telephone system, a plurality of exchanges each comprising subscribers' lines divided into groups, means whereby the lines of a plurality of groups are given access in common to a group of trunk lines terminating in automatic switches, a group of selector switches accessible to said automatic switches, a plurality of groups of trunk lines accessible to said selector switches, some of which groups extend to other exchanges, and individual switches for those trunk lines which extend to other exchanges, said switches having access in common to said first named trunk lines.

13. In a telephone trunking system, a plurality of lines terminating in a central exchange, a second central exchange, trunk lines between said exchanges, a selector switch accessible to a calling line in said first exchange, for selecting an idle one of said trunk lines, and an automatic switch individual to each of said trunk lines whereby the one selected may be connected with the said calling line independent of said selector switch, and means for then releasing the said selector switch to make it accessible to other calling lines.

14. In a telephone system, a plurality of exchanges each comprising subscribers' lines divided into groups, means whereby the lines of a plurality of groups are given access in common to a group of trunk lines terminating in automatic switches, a group of selector switches accessible to said automatic switches, a plurality of groups of trunk lines accessible to said selector switches, some of which groups extend to other exchanges, individual switches for those trunk lines which extend to other exchanges, said switches having access in common to said first named trunk lines, and means whereby upon the selection of a trunk line by a selector switch the individual switch associated with that trunk line is operated to establish a direct connection around such selector switch.

15. In a telephone system, a plurality of exchanges each comprising subscribers' lines divided into groups, means whereby the lines of a plurality of groups are given access in common to a group of trunk lines terminating in automatic switches, a group of selector switches accessible to said automatic switches, a plurality of groups of trunk lines accessible to said selector switches, some of which groups extend to other exchanges, individual switches for those trunk lines which extend to other exchanges, said switches having access in common to said first named trunk lines, means whereby upon the selection of a trunk line by a selector switch the individual switch associated with that trunk line is operated to establish a direct connection around such selector switch, and means for then releasing such selector switch to make it available for use in selecting other trunk lines.

16. In a telephone trunking system, a plurality of lines, a plurality of switches accessible to said lines for purposes of calling and being called, a trunk circuit for connecting calling and called lines having a finder switch at one end and a terminal at the other end in each of said first switches, a secondary trunk line having multiple terminals in said first switches and a terminal in said finder switch, means for extending a calling line to an idle one of said first switches, means for operating the selected switch to connect with said secondary trunk, auxiliary apparatus associated with said secondary trunk for controlling said finder switch to find the same whereby the calling line is connected to said trunk circuit, and auxiliary apparatus associated with said trunk circuit for selecting a called line and for controlling the extension thereof via one of said first switches into connection with said trunk circuit whereby the said calling and called lines may be connected.

17. In a telephone trunking system, a first exchange comprising a plurality of lines, a second exchange comprising a plurality of lines, a, selector switch in said first exchange and means for extending calling lines thereto, a connective circuit in said second exchange accessible to called lines therein and provided with a finder switch at one end, a selector switch in said second exchange having access to said connective circuit, and a trunk line between exchanges, said trunk line provided at the first exchange with terminals in said first selector switch and a finder switch having access to extensions of calling lines, and at the second exchange with terminals in said first finder switch and an automatic switch for connecting to said second selector switch.

18. In a telephone trunking system, a first exchange comprising a plurality of subscribers' lines, a second exchange comprising a plurality of subscribers' lines, trunk lines accessible to calling subscribers' lines in said first exchange and extending to said second exchange, local trunk lines accessible to calling subscribers' lines in said second exchange, a plurality of link circuits accessible to called lines in said second exchange, a finder switch for each link circuit having access to both local and inter-exchange trunk lines, and a selector switch accessible to trunk lines of both kinds for selecting an idle link circuit.

19. In a telephone trunking system, a first exchange and a second exchange, each exchange comprising a plurality of lines, trunk lines between exchanges, a plurality of link circuits for interconnecting lines in said first exchange, local trunk lines in said first exchange, automatic switches for extending calling lines to idle local trunk lines, a selector switch accessible to said local trunk lines for selecting idle link circuits or idle inter-exchange trunk lines, and a finder switch for each link circuit and for each inter-exchange trunk line, said finder switches having common access to said local trunk lines.

20. In a telephone trunking system, a first exchange comprising a plurality of lines, a second exchange comprising a plurality of lines, a, selector switch in said first exchange and means for extending calling lines thereto, a connective circuit in said second exchange accessible to called lines therein and provided with a finder switch at one end, a selector switch in said second exchange having access to said connective circuit, a trunk line between exchanges, said trunk line provided at the first exchange with terminals in said first selector switch and a finder switch having access to extensions of calling lines, and at the second exchange with terminals in said first finder switch and an automatic switch for connecting to said second selector switch, and means including said selector switches for controlling said finder switches whereby a connection may be established from a calling line in said first exchange to said connective circuit in said second exchange by way of said trunk line.

21. In a telephone trunking system, a first exchange comprising a plurality of lines, a second exchange comprising a plurality of lines, a selector switch in said first exchange and means for extending calling lines thereto, a connective circuit in said second exchange accessible to called lines therein and provided with a finder switch at one end, a selector switch in said second exchange having access to said connective circuit, a trunk line between exchanges, said trunk line provided at the first exchange with terminals in said first selector switch and a finder switch having access to extensions of calling lines, and at the second exchange with terminals in said first finder switch and an automatic switch for connecting to said second selector switch, and means for operating said selector switches in turn to establish controlling circuits for their associated finder switches whereby the latter may be directed to connect a calling line in said first exchange with the connective circuit in said second exchange by way of said trunk line.

22. In a telephone trunking system, a first exchange comprising a plurality of lines, a second exchange comprising a plurality of lines, a selector switch in said first exchange and means for extending calling lines thereto, a connective circuit in said second exchange accessible to called lines therein and provided with a finder switch at one end, a selector switch in said second exchange having access to said connective circuit, a trunk line between exchanges, said trunk line provided at the first exchange with terminals in said first selector switch and a finder switch having access to extensions of calling lines, and at the second exchange with terminals in said first finder switch and an automatic switch for connecting to said second selector switch, means including said selector switches for controlling said finder switches whereby a connection may be established from a calling line in said first exchange to said connective circuit in said second exchange by way of said trunk line, and means for then releasing said selector switches without disturbing said connection.

23. In a telephone trunking system, a first exchange comprising a plurality of lines, a second exchange comprising a plurality of lines, a selector switch in said first exchange and means for extending calling lines thereto, a connective circuit in said second exchange accessible to called lines therein and provided with a finder switch at one end, a selector switch in said second exchange having access to said connective circuit, a trunk line between exchanges, said trunk line provided at the first exchange with terminals in said first selector switch and a finder switch having access to extensions of calling lines, and at the second exchange with terminals in said first finder switch and an automatic switch for connecting to said second selector switch, means for operating said selector switches in turn to establish controlling circuits for their associated finder switches whereby the latter may be directed to connect a calling line in said first exchange with the connective circuit in said second exchange by way of said trunk line, and means for then releasing said selector switches without disturbing said connection.

24. In a telephone trunking system, a first exchange comprising a plurality of subscribers' lines, a second exchange comprising a plurality of subscribers' lines, trunk lines accessible to calling subscribers' lines in said first exchange and extending to said second exchange, local trunk lines accessible to calling subscribers' lines in said second exchange, a plurality of link circuits accessible to called lines in said second exchange, a finder switch for each link circuit having access to both local and inter-exchange trunk lines, a selector switch accessible to trunk lines of both kinds for selecting an idle link circuit, and means for operating the finder switch associated with a selected link circuit to establish a direct connection around said selector switch.

25. In a telephone trunking system, a first exchange and a second exchange, each exchange comprising a plurality of lines, trunk lines between exchanges, a plurality of link circuits for inter-connecting lines in said first exchange, local trunk lines in said first exchange, automatic switches for extending calling lines to idle local trunk lines, a selector switch accessible to said local trunk lines for selecting idle link circuits or idle inter-exchange trunk lines, a finder switch for each link circuit and for each inter-exchange trunk line, said finder switches having common access to said local trunk lines, and means for operating the finder switch associated with a selected link circuit or inter-exchange trunk line to establish a direct connection around said selector switch.

26. In a telephone trunking system, a first exchange comprising a plurality of subscribers' lines, a second exchange comprising a plurality of subscribers' lines, trunk lines accessible to calling subscribers' lines in said first exchange and extending to said second exchange, local trunk lines accessible to calling subscribers' lines in said second exchange, a plurality of link circuits accessible to called lines in said second exchange, a finder switch for each link circuit having access to both local and inter-exchange trunk lines, a selector switch accessible to trunk lines of both kinds for selecting an idle link circuit, means for operating the finder switch associated with a selected link circuit to establish a direct connection around said selector switch, and means for then releasing said selector switch to make it available for other connections.

27. In a telephone trunking system, a first exchange and a second exchange, each exchange comprising a plurality of lines, trunk lines between exchanges, a plurality of link circuits for inter-connecting lines in said first exchange, local trunk lines in said first exchange, automatic switches for extending calling lines to idle local trunk lines, a selector switch accessible to said local trunk lines for selecting idle link circuits or idle inter-exchange trunk lines, a finder switch for each link circuit and for each inter-exchange trunk line, said finder switches having common access to said local trunk lines, means for operating the finder switch associated with a selected link circuit or inter-exchange trunk line to establish a direct connection around said selector switch, and means for then releasing said selector switch to make it available for other connections.

28. In a telephone trunking system, a plurality of lines, a selector switch for use by calling lines in the selection of a called line, a finder switch associated with said selector switch for connecting with calling lines, said connecting process taking place in two stages, one completed before and the other after the operation of the associated selector.

29. In a telephone trunking system, a plurality of lines, a trunk circuit for interconnecting calling and called lines provided with an automatic switch at one end for connecting with calling lines and terminals at the other end accessible to called lines, and a selector switch individual to said trunk circuit for use in selecting called lines.

30 In a telephone trunking system, a plurality of lines, a trunk circuit for interconnecting calling and called lines provided with an automatic switch at one end for connecting with calling lines and terminals at the other end accessible to called lines, a selector switch individual to said trunk circuit for use in selecting called lines, and means whereby the operation of said automatic switch is made dependent in part upon the mechanical operation of said selector.

31. In a telephone trunking system, a plurality of lines, a trunk circuit for interconnecting calling and called lines provided with an automatic switch at one end for connecting with calling lines and terminals at the other end accessible to called lines, a selector switch individual to said trunk circuit for use in selecting called lines, means whereby the operation of said automatic switch is made dependent in part upon the mechanical operation of said selector, and means for disconnecting the wipers of said selector after its operation without releasing it mechanically.

32. In a telephone trunking system, a plurality of lines, a group of trunk lines for connecting calling and called lines, means for extending a calling line to an idle one of said trunk lines, a series of trunking switches associated with each trunk line and controllable over the said calling line for selecting a called line, an automatic switch accessible to a line when called and having access to said trunk lines, and a test circuit for controlling said automatic switch said test circuit including contacts in said trunking switches.

33. In a telephone trunking system, a plurality of lines divided into groups, trunk lines extending from each group to the other groups, local trunk lines in each group accessible to calling lines therein, a selector switch for each group accessible to said local trunk lines for selecting a trunk line to any of the other groups, a finder switch for each inter-group trunk line having access to the local trunk lines in the group where it originates, and a test conductor associated with each local trunk line.

34. In a telephone trunking system, a plurality of lines divided into groups, trunk lines extending from each group to the other groups, local trunk lines in each group accessible to calling lines therein, a selector switch for each group accessible to said local trunk lines for selecting a trunk line to any of the other groups, a finder switch for each inter-group trunk line having access to the local trunk lines in the group where it originates, a test conductor associated with each local trunk line, means for extending a calling line in any group to its associated selector switch by way of an idle local trunk line, and means for operating said selector switch to extend the test conductor associated with the said local trunk line to the finder switch associated with an idle inter-group trunk line.

35. In a telephone trunking system, a plurality of lines divided into groups, trunk lines extending from each group to the other groups, local trunk lines in each group accessible to calling lines therein, a selector switch for each group accessible to said local trunk lines for selecting a trunk line to any of the other groups, a finder switch for each inter-group trunk line having access to the local trunk lines in the group where it originates, a test conductor associated with each local trunk line, means for extending a calling line in any group to its associated selector switch by way of an idle local trunk line, means for operating said selector switch to extend the test conductor associated with the said local trunk line to the finder switch associated with an idle inter-group trunk line, a controlling relay for the said finder switch and a battery included in series with said test conductor.

36. In a telephone trunking system, a plurality of lines divided into groups, trunk lines extending from each group to the other groups, local trunk lines in each group accessible to calling lines therein, a selector switch for each group accessible to said local trunk lines for selecting a trunk line to any of the other groups, a finder switch for each inter-group trunk line having access to the local trunk lines in the group where it originates, a test conductor associated with each local trunk line, means for extending a calling line in any group to its associated selector switch by way of an idle local trunk line, means for operating said selector switch to extend the test conductor associated with the said local trunk line to the finder switch associated with an idle inter-group trunk line, a controlling relay for the said finder switch, a battery included in series with said test conductor, means for operating said finder switch until a circuit is completed over said test conductor whereby the said controlling relay is operated to bring the finder switch to rest in connection with the local trunk line connected with the said calling line.

37. In a telephone trunking system, a plurality of lines, a trunk line, a finder switch for said trunk line having sets of fixed terminals and movable terminals cooperating therewith, means for extending a calling line to a set of said fixed terminals, a conductor terminating at one end in a test terminal of said set, means operable over the said calling line and comprising a series of trunking switches for extending the other end of said conductor into connection with a movable terminal of said finder switch, means for operating said finder switch to connect the two ends of said conductor, whereby a test circuit for said finder switch is completed, a battery in said test circuit, and a controlling relay for said finder in said test circuit and operable upon the completion thereof for stopping the said finder switch with its movable terminals in engagement with the fixed terminals to which the said calling line has been extended.

38. In a telephone trunking system, a plurality of lines, a trunk accessible to calling lines and having an auxiliary switch associated therewith, a plurality of other trunk lines each provided with a finder switch, said finders having access in common to said first trunk line, a selector switch accessible to said auxiliary switch for selecting an idle trunk line of said plurality, and a test conductor associated with said first trunk and extended in the operation of said auxiliary switch and selector switch to the finder switch associated with a selected trunk in said plurality.

39. In a telephone trunking system, a plurality of lines, a trunk accessible to calling lines and having an auxiliary switch associated therewith, a plurality of other trunk lines each provided with a finder switch, said finders having access in common to said first trunk line, a selector switch accessible to said auxiliary switch for selecting an idle trunk line of said plurality, a test conductor associated with said first trunk and extended in the operation of said auxiliary switch and selector switch to the finder switch associated with a selected trunk in said plurality, means for operating said finder switch to complete a circuit over said test conductor and means included in said circuit for controlling said operation.

40. In a telephone trunking system, a central exchange comprising a plurality of lines, means accessible to a calling line and comprising a plurality of serially related numerical trunking switches for locating a called line, a non-numerical switch for establishing a direct path around certain of said numerical switches before the others are operated, and means for releasing said trunking switches independent of said non-numerical switch to make them accessible to other calling lines.

41. In a telephone system, means comprising a plurality of serially related forward and backward selecting automatic trunking switches for connecting calling and called lines, an independent series of numerical trunking switches for controlling the backward selecting operations, and means for operating switches in both series alternately during the establishment of a connection.

42. In a telephone system, means for connecting a calling and called line comprising a plurality of serially related trunk lines, a numerical trunking switch associated with the forward end of each trunk line and adapted to be controlled over the calling line to select the next trunk forward in the series, and a finder switch associated with the backward end of each trunk line adapted to be operated automatically when the associated trunk is selected to select the next trunk backward in the series.

43. In a telephone system, means for connecting a calling and called line comprising a plurality of serially related trunk lines, a numerical trunking switch associated with the forward end of each trunk line and adapted to be controlled over the calling line to select the next trunk forward in the series, a finder switch associated with the backward end of each trunk line adapted to be operated automatically when the associated trunk is selected to select the next trunk backward in the series, and means whereby said numerical trunk selecting switches are successively restored to idle condition by the operation of said finder switches.

44. In a telephone trunking system, non-numerical trunking switches common to calling and called lines, means including a plurality of said switches associated with a calling line and a similar plurality associated with a called line for connecting said lines, backward selecting finder switches and connecting trunk lines included in the connection between said pluralities of switches, and a series of numerical trunking switches controlled over the calling line to locate the called line and initiate the operation of the said switches associated therewith.

45. In a telephone system, a calling line and equipment individual thereto, a called line and equipment individual thereto, a plurality of links for building up a connection between the two, an auxiliary link, means for extending a connection from the calling line toward the called line by bringing together a plurality of said links and for thereafter substituting said auxiliary link for a plurality of said connected links before the last one of said first mentioned links establishes connection with any part of the equipment individual to the called line.

46. In a telephone system, a calling line and equipment individual thereto, a called line and equipment individual thereto, a plurality of links for building up a connection between the two, an auxiliary link, electromagnetic switching means for extending a connection from the calling line toward the called line by bringing together a plurality of said links and for thereafter substituting said auxiliary link for a plurality of said connected links before the last one of said first mentioned links establishes connection with any part of the equipment individual to the called line.

47. In a telephone system, a pair of lines, a plurality of trunk lines for use in establishing a connection between said lines, means for substituting one trunk line for several trunk lines used in establishing a connection between said lines before the connection is completed.

48. In a telephone system, a pair of lines, a plurality of trunk lines for use in establishlishing a connection between said lines means for substituting one trunk line for several trunk lines used in establishing a connection between said lines before the connection is completed and for breaking the connection between the eliminated trunks.

49. In a telephone system, a pair of lines, a plurality of trunk lines for use is establishing a connection between said lines, means for substituting one trunk line for several trunk lines used in establishing a connection between said lines before the connection is completed, and for breaking the connection between the first line and the eliminated trunks.

50. In a telephone system, a pair of lines, a plurality of trunk lines for use in establishing a connection between said lines, means for reducing the number of trunk lines used in establishing a connection between said lines before the connection is completed.

51. In a telephone system, means for building up a connection between a calling and called line comprising a plurality of numerical trunking switches consecutively operated, means for releasing a plurality of said switches before the connection is completed and means for releasing all the rest of said switches except one after the connection is completed.

52. In a telephone system, calling and called lines, means for connecting the two comprising a plurality of numerical automatic progressively movable trunking switches, means for releasing a pair of said switches and for maintaining the connection through only one of said switches.

53. In a telephone system, calling and called lines, means for connecting the two comprising three numerical automatic progressively movable trunking switches, and means for releasing two of said switches, one on each side of an intermediate switch and for maintaining the connection through the intermediate switch.

54. A telephone system including subscribers' telephone lines, non-restoring rotary trunk selecting primary switches, non-restoring rotary trunk selecting secondary switches, contact makers for each of said primary switches normally in engagement with the last secondary switch used, contact makers for each of said secondary switches normally in engagement with the last first selector switch used, first selector switches, operating mechanism for said rotary switches, and substation controlled means for operating the mechanisms of said primary and secondary rotary switches to connect idle first selectors with calling lines, said actuations of the switches to connect calling lines with first selector switches being established without operating the motor magnets of the primary and secondary switches if the wipers of the same are in engagement with idle trunks.

55. A telephone system including subscribers' telephone lines, non-restoring rotary primary switches, nonrestoring rotary secondary switches, contact makers for said primary switches normally in engagement with the last secondary switches used, contact makers for said secondary switches normally in engagement with the last first selector used, first selector switches, operating mechanism for said rotary switches, substation controlled means for operating the mechanisms of said primary and secondary rotary switches to connect idle first selectors with calling lines, said connections being effected without operating the motor mechanism of the primary and secondary switches if the wipers of the primary and secondary switches are in engagement with idle trunks at the time that calls are initiated, and means for disassociating said calling subscribers' lines and said first selector switches while maintaining said rotary switches in their antecedent progressive positions.

56. A telephone system including subscribers' telephone lines, a first selector switch, a secondary non-numerical non-restoring trunking switch having movable contact makers normally in engagement with a trunk directly connected to said first selector switch, a primary non-restoring non-numerical trunking switch having contact makers directly in connection with a trunk leading to said secondary switch, said primary and secondary switches being for use in effecting connection between a calling one of said lines and said first selector switch, and means controlled by the removal of the receiver at the substation of said calling line for effecting said connection while maintaining said non-numerical switches in their antecedent progressive positions, without moving the contact makers of said trunking switches.

57. A telephone system including a calling and a called subscriber's line, a rotary non-restoring trunk selecting primary switch, a rotary non-restoring trunk selecting secondary switch, contact makers for said primary and secondary switches adapted to always rotate in the same direction, a numerical switch, means controlled by the calling subscriber for connecting to said numerical switch via said primary and secondary switches, and substation controlled means for operating said numerical switch in accordance with the first digit of the called number to extend the connection in the direction of the called line.

58. A telephone system including a calling subscriber's line, a first selector switch, a secondary trunk selecting switch having its wipers normally in engagement with a trunk extending to said first selector switch, a primary switch having its wipers normally in engagement with a trunk extending to said secondary switch, means for connecting said calling subscriber's line to said first selector switch via said primary and secondary switches while maintaining the wipers of said primary and secondary switches in connection with said trunks, and means for disconnecting said calling line from said first selector switch while maintaining said primary and secondary switches in their antecedent positions.

59. A telephone system including a subscriber's telephone line provided with an individual primary switch, a secondary trunking switch having only three movable contact makers accessible to said primary switch, a first selector switch accessible to said secondary switch, bank contacts for said secondary switch having conductors connected thereto and directly extending to said first selector switch, and subscriber controlled means for extending a connection through said primary and secondary switches to said first selector switch without moving the wipers of said primary and secondary switches.

60. A telephone system including a subscriber's telephone line, a trunk selecting switch individual thereto, a secondary trunk selecting switch, having only three contact makers, bank contacts for said secondary trunk selecting switch, a first selector switch, trunk conductors connecting the bank contacts of the secondary switch directly to said first selector switch, movable contact wipers for said individual switch, means for extending a connection from said subscriber's line through said individual and secondary switches to said first selector switch, and means for releasing said connection without altering the antecedent progressive positions of said individual and secondary switches.

61. A telephone system including a subscriber's telephone line, a trunk selecting switch individual thereto, a secondary trunk selecting switch provided with only three contact wipers, a pair of talking wipers and a test wiper, a first selector switch, bank contacts for said secondary trunk selecting switch conductors extending directly from said bank contacts to said first selector switch, individual contact wipers for said individual switch, means for extending a connection from said subscriber's line through said individual and secondary switches to said first selector switch, means for releasing said connection, and means for reestablishing said connection without moving the wipers of said individual and secondary switches.

62. A telephone system including subscribers' telephone lines, non-restoring rotary primary switches, non-restoring rotary trunk selecting secondary switches, trunks leading from the banks of the primary switches directly to the said secondary switches, connective links, trunks leading directly from the banks of the secondary switches to said connective links, individual operating mechanism for said rotary switches, substation controlled means for operating the mechanisms of said primary and secondary rotary switches to connect idle connective links with calling lines, means for dissociating said calling subscribers' lines and said connective links while maintaining said rotary switches in their antecedent progressive positions and without actuating said operating mechanism, said switches now being effective to extend other connections from the calling lines to the connective links without actuating the operating mechanism of the switches whereby said connections are completed without moving the active contacts of the rotary switches.

63. A telephone system including subscribers' telephone lines, a connective link, a plurality of non-numerical trunking switches for extending a connection from a calling one of said lines to said connective link, movable contact makers for said non-numerical switches, means controlled by the removal of the receiver at the substation of said calling line for effecting said connection while maintaining said non-numerical switches in their antecedent progression positions, and means for disconnecting said line from said connecting link while maintaining said contact makers in their selective positions.

64. A telephone system including a calling subscriber's line provided with an individual non-numerical trunk selecting rotary switch, a secondary non-numerical trunk selecting rotary switch accessible to said individual rotary switch, motor mechanism for each of said switches, a connective link, trunk conductors extending directly from said connective link to bank contacts of said secondary switch, and means under the control of the calling subscriber for operating the individual motor mechanisms of said rotary switches to operatively connect the calling line with said connective link, said switches being operative to extend a second connection from said calling line to said connective link without operating the motor mechanisms of the switches if said switches are on idle contacts when the second connection is effected.

65. A telephone system including a calling subscriber's line, an automatic non-numerical trunk selecting switch individual thereto, a secondary automatic non-numerical trunk selecting switch accessible to said first automatic switch, motor mechanism for each of said switches, a connective link, conductors extending directly from the bank of said secondary switch to said connective link, means responsive to the removal of the receiver at the calling substation to connect said connective link with said calling line via said rotary switches without operating the motor mechanisms of said rotary switches, and means for extending a connection from said connective link to a called subscriber's line, thereby completing a talking connection involving the said primary and secondary switches and the said connective link.

66. A telephone system including subscribers' telephone lines, non-restoring primary rotary trunk selecting switches, non-restoring secondary rotary trunk selecting switches, connecting circuits, trunk connections extending directly from the banks of the rotary switches to the connecting circuits, individual operating mechanisms for said switches, substation controlled means for operating the mechanisms of said primary and secondary switches to connect idle connecting circuits with calling lines and for disconnecting subscribers' lines from said connecting circuits without operating said operating mechanisms, said switches being operable to now extend other connections from calling lines to idle connected circuits without operating the mechanism of the switches, and means for completing connections from said connecting circuits to called subscribers' lines, said connections including primary and secondary trunking switches and one of said connecting circuits.

67. A telephone system including a calling subscriber's line, a connective link, a secondary trunk selecting non-numerical switch having its wipers normally in engagement with a trunk extending to said connective link, a primary trunk selecting non-numerical switch having its wipers normally in engagement with a trunk extending to said secondary switch, means for connecting said calling subscriber's line to said connective link via said primary and secondary switches while maintaining the wipers of said primary and secondary switches in connection with said trunks, and means for extending a connection from the connective link to a called subscriber's line, the completed connection including the primary and secondary switches and the connective link.

68. A telephone system including a calling subscriber's line, a connective link, a secondary trunk selecting non-numerical switch having its wipers normally in engagement with a trunk extending to said connective link, a primary trunk selecting non-numerical switch having its wipers normally in engagement with a trunk extending to said secondary switch, means for connecting said calling subscriber's line to said connective link via said primary and secondary switches while maintaining the wipers of said primary and secondary switches in connection with said trunks, means for disconnecting said calling line from said connective link while maintaining said primary and secondary switches in their antecedent positions, and means for completing a talking connection between said calling subscriber's line and a called subscriber's line, said talking connection when completed including said connective link and said primary and secondary trunking switches.

69. A telephone system including a subscriber's telephone line, connective links, primary and secondary rotary switches for connecting said calling line to an idle connective link, said primary and secondary switches being of the non-restoring type and provided with movable contact makers to always rotate in the same direction, and substation controlled means for connecting said calling line to an idle one of said connective links and for operating the switch adjusting mechanisms of said primary and secondary switches only if the trunks that they are in connection with are busy.

70. A telephone system including a subscriber's telephone line, an individual non-numerical trunking switch for said line, secondary switches accessible to said individual switch, connective links accessible to said secondary switches, trunks interconnecting said individual and said secondary switches, trunks interconnecting said secondary switches and said connective links, means controlled over the calling subscriber's line for operating said individual switch and an idle one of said secondary switches to extend a connection to an idle connective link while maintaining contact makers of said individual and secondary switches in their antecedent progressive positions if they are in connection with idle trunks, and means for directly extending the talking connection from an idle connective link to a called subscriber's line.

71. A telephone system including a subscriber's telephone line, connective links, primary and secondary non-restoring trunk selecting switches for connecting said telephone line to an idle one of said connective links, contact makers for said switches, trunks extending directly from the bank of the primary switch to the secondary switch and from the bank of the secondary switch to the said connective links, substation controlled means for disconnecting said subscriber's line from said connective link while maintaining the contact makers of said switches in their antecedent progressive positions, and means for completing talking connections from the calling telephone line through the primary and secondary trunking switches and the selected connective link to a called subscriber's line, said completed connection including the idle connective link, and subscriber-controlled means for releasing the idle connective link.

72. A telephone system including a subscriber's telephone line provided with an individual non-numerical trunk selecting primary switch, a non-numerical secondary trunking switch accessible to said primary switch, a connective link accessible to said secondary switch, a trunk extending directly from the bank of the secondary switch to the connecting link, subscriber controlled means for extending a connection through said primary and secondary switches to said connecting link without moving the wipers of said primary and secondary switches, means for extending a connection directly from the connecting link to a called subscriber's line, and subscriber-controlled means for disconnecting the connecting link from the called subscriber's line.

73. A telephone system including a subscriber's line, a link circuit, a primary and a secondary non-numerical trunk selecting switch for extending connection from said line to said link circuit, a trunk extending directly from said primary to said secondary switch and a second trunk extending directly from the bank of said secondary switch to said link circuit, movable contact makers for each of said switches, subscriber-controlled means for connecting said line to said link circuit without moving the contact makers of said switches, means for completing a talking connection with a called subscriber's line, and subscriber-controlled means for disconnecting the link circuit from the called subscriber's line.

74. In a telephone system, a subscriber's line, a switching device common to said line and other lines, and serially related forward selecting primary, secondary and tertiary non-numerical trunking switches for connecting said line with said switching device.

75. In a telephone system, a subscriber's line, a first selector switch operable in accordance with the first digit in a called telephone number, and serially related primary, secondary, and tertiary non-numerical trunking switches responsive to the removal of the receiver at the station on said line for connecting said line with said first selector.

76. In a telephone system, a subscriber's line, a first selector switch, three serially related non-numerical trunking switches successively responsive to the removal of the receiver at the station on said line for connecting said line with said first selector, and means at said station for then operating said first selector in accordance with the first digit in a called telephone number.

77. In a telephone system, a subscriber's line, a non-numerical rotary primary switch individual to said line, a plurality of non-numerical rotary secondary switches directly accessible to said primary switch, a plurality of non-numerical rotary tertiary switches directly accessible to said secondary switches; a group of trunks accessible to said tertiary switches, progressively movable wipers for each of said rotary switches having no normal position, and means for controlling said primary switch, one of said secondary switches, and one of said tertiary switches to connect said line with one of said trunk lines while maintaining the wipers of such switches in their antecedent advanced positions.

78. In a telephone system, a subscriber's line, a non-numerical rotary primary switch individual to said line, a plurality of non-numerical rotary secondary switches directly accessible to said primary switch, a trunk line terminating in a finder switch, a link circuit terminating at one end in multiple bank contacts in said secondary switches and at the other end in bank contacts in said finder switch, progressively movable wipers for said switches having no normal position, and means for controlling the said primary and finder switches and one of said secondary switches to connect said line with said trunk line by way of said link circuit while maintaining the wipers of such switches in their antecedent advanced positions.

79. In a telephone system, a subscriber's line, a primary line switch indivdual to said line, a secondary line switch directly accessible to said primary switch, a link circuit terminating at one end in a finder switch and at the other end in a trunk selecting switch, a second link circuit terminating at one end in bank contacts of said secondary switch and at the other end in bank contacts of said finder switch, trunk lines accessible to said trunk selecting switch, and means for operating said switches to connect said subscriber's line with an idle trunk line.

80. In a telephone system, a subscriber's line, a primary line switch individual to said line, a secondary line switch directly accessible to said primary switch, a link circuit terminating at one end in a finder switch and at the other end in a trunking selecting switch, a second link circuit terminating at one end in bank contacts of said secondary switch and at the other end in bank contacts of said finder switch, wipers for each of said switches movable in one direction only and having no normal position, trunk lines accessible to said trunk selecting switches, and means for controlling said switches to connect said subscriber's line with one of said trunk lines via said link circuits while maintaining the wipers of such switches in their antecedent advanced positions.

81. In a telephone system, a calling and a called line, individual rotary line switches for said lines, said switches being provided with wipers having no normal position and movable in one direction only, and means for establishing a talking connection between said lines including the wipers of both switches while maintaining said wipers in their antecedent advanced position.

82. In a telephone system, a central exchange, local trunk lines in said exchange and trunk lines extending to other exchanges, a first selector, a subscriber's line and means for extending it to said first selector when the subscriber calls, subscriber controlled means for operating said first selector to select a local trunk line or an interoffice trunk line extending to any desired exchange, automatic means effective in any case to connect the said subscriber's line with the selected trunk line over a path excluding said first selector and means for restoring said selector to common use while the said line and trunk line remain connected.

83. In a telephone system, a final connector switch having two sets of wipers, one set being normally connected and the other set being normally disconnected, two groups of subscriber's telephone lines accessible to said two sets of wipers, respectively, two trunk lines terminating in said switch, and means effective when said connector is taken for use by way of a particular one of said trunk lines for disconnecting the normally connected set of wipers and for connecting up the normally disconnected set.

84. In a telephone system, a plurality of groups of lines, a finder switch having a plurality of sets of wipers, one set for each of said groups, means for causing said finder to operate its wiper sets simultaneously in search of a designated line, means for stopping the operation when a wiper set engages the line, and selecting mechanism in said finder operated automatically to search for and connect with the particular set of wipers in use.

Signed at Chicago, Illinois, Cook County.

ANDERS M. MALMBERG.